US009199565B2

(12) United States Patent
McMillen et al.

(10) Patent No.: US 9,199,565 B2
(45) Date of Patent: Dec. 1, 2015

(54) LUMBAR SUPPORT SYSTEM

(75) Inventors: Robert J. McMillen, Tecumseh (CA); Horia Blendea, LaSalle (CA); Paul Tindall, Harrow (CA)

(73) Assignee: LEGGETT & PLATT CANADA CO., Halifax, Nova Scotia (CA)

( * ) Notice: Subject to any disclaimer, the term of this patent is extended or adjusted under 35 U.S.C. 154(b) by 209 days.

(21) Appl. No.: 13/614,154

(22) Filed: Sep. 13, 2012

(65) Prior Publication Data

US 2014/0070583 A1 Mar. 13, 2014

(51) Int. Cl.
*B60N 2/66* (2006.01)

(52) U.S. Cl.
CPC ........................................ *B60N 2/66* (2013.01)

(58) Field of Classification Search
USPC ................................. 297/284.4, 284.1, 284.2
See application file for complete search history.

(56) References Cited

U.S. PATENT DOCUMENTS

| | | | |
|---|---|---|---|
| 3,273,877 A | 9/1966 | Geller et al. | |
| 3,608,960 A | 9/1971 | Sherman | |
| 3,807,794 A | 4/1974 | Beyer | |
| 4,072,287 A | 2/1978 | Swenson et al. | |
| 4,295,681 A | 10/1981 | Gregory | |
| 4,354,709 A | 10/1982 | Schuster | |
| 4,462,635 A | 7/1984 | Lance | |
| 4,531,779 A | 7/1985 | Hashimoto | |
| 4,602,819 A | 7/1986 | Morel | |
| 4,636,000 A | 1/1987 | Nishino | |
| 4,678,230 A | 7/1987 | Winkle | |
| 4,811,986 A | 3/1989 | Hattori et al. | |
| 4,880,271 A | 11/1989 | Graves | |
| 4,981,325 A | 1/1991 | Zacharkow | |

(Continued)

FOREIGN PATENT DOCUMENTS

| CA | 1126148 | 6/1982 |
|---|---|---|
| DE | 3145217 | 5/1983 |

(Continued)

OTHER PUBLICATIONS

International Search Report and Written Opinion of the International Searching Authority, received for International Patent Application No. PCT/CA2013/000633, mailed Oct. 23, 2013 (10 pages).

(Continued)

*Primary Examiner* — David R Dunn
*Assistant Examiner* — Timothy J Brindley
(74) *Attorney, Agent, or Firm* — Michael Best & Friedrich LLP

(57) ABSTRACT

A lumbar support system for a seat backrest having a fixed frame includes a lumbar support coupled to the fixed frame that is movable from a first position to a second position and a motor for moving the lumbar support. A threaded member is operatively associated with the motor such that the motor rotates the threaded member about an axis. A traveling member is operatively associated with the threaded member such that rotation of the threaded member translates the traveling member along the threaded member. The system further includes a flexible cable having a first end and a second end. The first end is coupled to the traveling member for movement therewith and the second end is coupled to the fixed frame such that translation of the traveling member in response to rotation of the threaded member moves the lumbar support element from the first position to the second position.

19 Claims, 21 Drawing Sheets

(56) References Cited

U.S. PATENT DOCUMENTS

| | | |
|---|---|---|
| 4,987,788 A | 1/1991 | Bausch et al. |
| 5,026,116 A | 6/1991 | Dal Monte |
| 5,050,930 A | 9/1991 | Schuster et al. |
| 5,078,449 A | 1/1992 | Suzuki |
| 5,217,278 A | 6/1993 | Harrison et al. |
| 5,314,236 A | 5/1994 | Suzuki et al. |
| 5,344,211 A | 9/1994 | Adat et al. |
| 5,462,335 A | 10/1995 | Seyler |
| 5,466,045 A | 11/1995 | Akima |
| 5,507,559 A | 4/1996 | Lance |
| 5,518,294 A | 5/1996 | Ligon, Sr. et al. |
| 5,553,919 A | 9/1996 | Dennis |
| 5,590,744 A | 1/1997 | Belmond et al. |
| 5,609,394 A | 3/1997 | Ligon, Sr. et al. |
| D383,928 S | 9/1997 | Earleywine, Jr. |
| 5,681,005 A | 10/1997 | Ligon, Sr. et al. |
| 5,685,606 A | 11/1997 | Lance |
| 5,769,490 A | 6/1998 | Falzon |
| 5,788,328 A | 8/1998 | Lance |
| 5,797,652 A | 8/1998 | Darbyshire |
| 5,823,620 A | 10/1998 | Le Caz |
| 5,842,659 A | 12/1998 | Ligon, Sr. et al. |
| 5,857,743 A | 1/1999 | Ligon, Sr. et al. |
| 5,934,752 A | 8/1999 | Klingler |
| 5,967,608 A | 10/1999 | Van Sickle |
| 5,984,407 A | 11/1999 | Ligon, Sr. et al. |
| 5,988,745 A * | 11/1999 | Deceuninck ............... 297/284.4 |
| 6,045,185 A | 4/2000 | Ligon, Sr. et al. |
| 6,050,641 A | 4/2000 | Benson |
| 6,068,336 A | 5/2000 | Schonauer |
| 6,227,618 B1 | 5/2001 | Ligon, Sr. et al. |
| 6,254,186 B1 | 7/2001 | Falzon |
| 6,270,158 B1 | 8/2001 | Hong |
| 6,296,308 B1 | 10/2001 | Cosentino et al. |
| 6,375,262 B1 | 4/2002 | Watanabe |
| 6,412,868 B1 | 7/2002 | Kuster |
| 6,499,803 B2 | 12/2002 | Nakane et al. |
| 6,575,530 B1 | 6/2003 | Fischer et al. |
| 6,631,951 B2 | 10/2003 | Blendea et al. |
| 6,676,214 B2 | 1/2004 | McMillen et al. |
| 6,692,074 B1 | 2/2004 | Kopetzky |
| 6,779,844 B2 | 8/2004 | Dosen et al. |
| 6,880,424 B2 | 4/2005 | McMillen |
| 6,893,089 B2 | 5/2005 | McMillen et al. |
| 6,905,170 B2 | 6/2005 | McMillen et al. |
| 6,908,153 B2 | 6/2005 | Blendea |
| 6,918,634 B2 | 7/2005 | Elliot |
| 6,938,955 B2 | 9/2005 | VanSickle |
| 7,011,369 B2 | 3/2006 | Massara et al. |
| 7,083,232 B2 | 8/2006 | Frank |
| 7,131,694 B1 | 11/2006 | Buffa |
| 7,140,681 B2 | 11/2006 | McMillen |
| 7,425,036 B2 | 9/2008 | McMillen |
| 7,429,080 B2 | 9/2008 | Walker et al. |
| 7,488,039 B2 | 2/2009 | Fischer et al. |
| 7,517,024 B2 | 4/2009 | Cvek |
| 7,549,700 B2 | 6/2009 | Blendea |
| 7,690,727 B2 | 4/2010 | Fischer et al. |
| 7,770,972 B2 | 8/2010 | Popa |
| 7,823,975 B2 | 11/2010 | Prause et al. |
| 7,862,119 B2 | 1/2011 | Schafer et al. |
| 7,971,934 B2 | 7/2011 | LaPointe et al. |
| 7,997,650 B2 | 8/2011 | McMillen et al. |
| 8,091,966 B2 | 1/2012 | Schweizer et al. |
| 8,091,967 B2 | 1/2012 | Schweizer et al. |
| 2003/0111884 A1 | 6/2003 | Dosen et al. |
| 2003/0184139 A1 | 10/2003 | Sloan, Jr. |
| 2003/0227203 A1 * | 12/2003 | Mundell ............... 297/284.4 |
| 2004/0108760 A1 | 6/2004 | McMillen |
| 2004/0140700 A1 | 7/2004 | McMillen et al. |
| 2004/0245824 A1 * | 12/2004 | McMillen ............... 297/284.4 |
| 2005/0184200 A1 | 8/2005 | Schwarzbich |
| 2006/0103204 A1 | 5/2006 | Walker et al. |
| 2006/0273643 A1 * | 12/2006 | McMillen ............... 297/284.4 |
| 2007/0102977 A1 | 5/2007 | Fischer et al. |
| 2007/0236062 A1 * | 10/2007 | McMillen et al. ......... 297/284.4 |
| 2007/0236063 A1 * | 10/2007 | Blendea ............... 297/284.4 |
| 2007/0296256 A1 * | 12/2007 | Colja et al. ............... 297/284.4 |
| 2009/0079245 A1 | 3/2009 | Marcantoni |
| 2009/0174241 A1 * | 7/2009 | Pattyn et al. ............... 297/284.4 |
| 2009/0184552 A1 * | 7/2009 | Vanparys et al. ........... 297/284.4 |
| 2009/0236889 A1 | 9/2009 | Prause et al. |
| 2010/0066144 A1 * | 3/2010 | Schweizer et al. ......... 297/284.8 |
| 2010/0156158 A1 | 6/2010 | LaPointe et al. |
| 2010/0268133 A1 | 10/2010 | Samain |
| 2011/0115268 A1 | 5/2011 | Maierhofer et al. |
| 2011/0266849 A1 | 11/2011 | Schwarze |
| 2012/0126600 A1 * | 5/2012 | Samain et al. ............... 297/284.4 |
| 2014/0070583 A1 * | 3/2014 | McMillen et al. ......... 297/284.4 |
| 2014/0070584 A1 * | 3/2014 | McMillen et al. ......... 297/284.4 |
| 2014/0125102 A1 * | 5/2014 | McMillen et al. ......... 297/284.4 |
| 2014/0125103 A1 * | 5/2014 | Suzuki ............... 297/284.7 |

FOREIGN PATENT DOCUMENTS

| | | |
|---|---|---|
| DE | 3616155 A1 | 11/1987 |
| DE | 3619188 C1 | 12/1987 |
| DE | 4129934 | 3/1993 |
| DE | 10021508 A1 | 11/2001 |
| DE | 20309193 | 8/2003 |
| DE | 10021508 B4 | 2/2004 |
| DE | 10310488 | 7/2004 |
| DE | 102008047243 | 3/2010 |
| DE | 102010039353 | 2/2012 |
| DE | 102010061788 | 5/2012 |
| EP | 420824 A1 | 4/1991 |
| EP | 518830 A1 | 12/1992 |
| EP | 537839 A1 | 4/1993 |
| EP | 540481 A1 | 5/1993 |
| EP | 563709 A2 | 10/1993 |
| EP | 1663704 | 6/2006 |
| EP | 2039720 | 3/2009 |
| FR | 1543602 A | 10/1968 |
| GB | 2335843 A | 10/1999 |
| GB | 2335844 A | 10/1999 |
| JP | 51096658 A | 8/1976 |
| JP | 62066538 U | 4/1987 |
| JP | 5207920 A | 8/1993 |
| JP | 6165718 A | 6/1994 |
| JP | 9327149 | 12/1997 |
| JP | 2002102011 A | 4/2002 |
| WO | 0164475 A1 | 9/2001 |
| WO | 2004049869 A2 | 6/2004 |
| WO | 2004089693 A2 | 10/2004 |

OTHER PUBLICATIONS

U.S. Patent and Trademark Office Action received in U.S. Appl. No. 13/840,928, dated Feb. 13, 2015 (8 pages).

U.S. Patent and Trademark Office Action received in U.S. Appl. No. 14/156,122, dated Feb. 5, 2015 (9 pages).

International Search Report and Written Opinion of the International Searching Authority for Application No. PCT/CA2015/000015 dated Apr. 27, 2015 (11 pages).

* cited by examiner

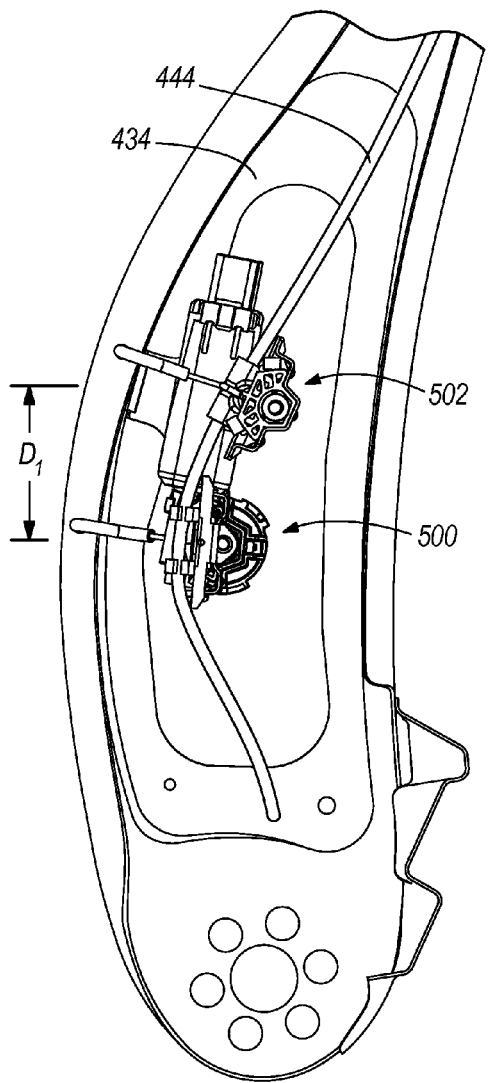 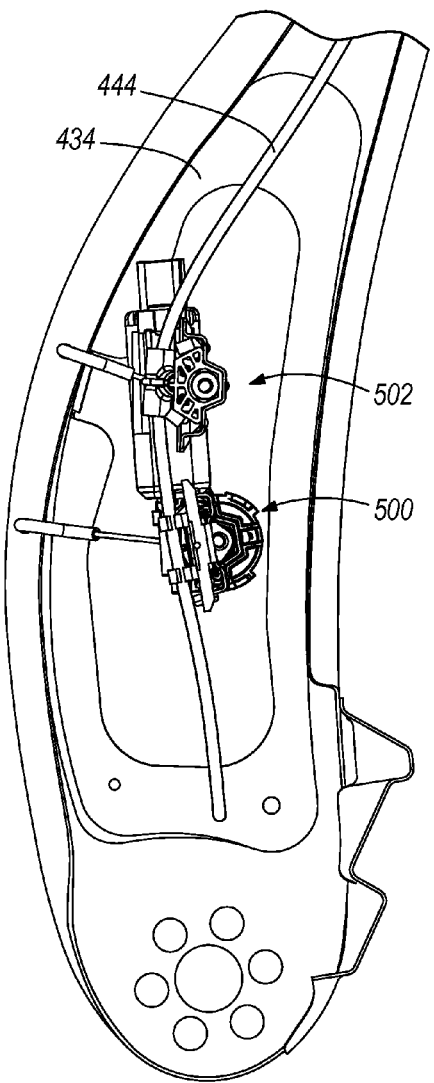
FIG. 11    FIG. 12

LUMBAR SUPPORT SYSTEM

BACKGROUND

The present invention relates to a lumbar support system for use within a seat, specifically for use within a vehicle seat.

Many lumbar support systems use an electromechanical actuator to move a load via a Bowden cable. The use of a Bowden cable, however, often results in poor total system efficiency, and such systems typically require numerous components, to include large, heavy motor(s) for actuation. In addition, these systems tend to be noisy during operation.

SUMMARY

In one embodiment of a lumbar support system for a seat backrest, the system includes a fixed frame and a lumbar support coupled to the fixed frame that is movable from a first position to a second position. A motor is coupled to the lumbar support. A threaded member is operatively engaged with the motor such that the motor rotates the threaded member about an axis. A first traveling member is engaged with the threaded member and a second traveling member is engaged with the threaded member. Rotation of the threaded member translates the first and second traveling members in opposite axial directions along the threaded member. A first flexible cable has a first end coupled to the first traveling member for movement therewith, a second end coupled to the fixed frame, and an intermediate portion operatively associated with the lumbar support. A second flexible cable has a first end coupled to the second traveling member for movement therewith, a second end coupled to the fixed frame, and an intermediate portion operatively associated with the lumbar support. The intermediate portion of the first flexible cable and the intermediate portion of the second flexible cable operate to move the lumbar support from the first position to the second position in response to translation of the first and second traveling members.

In an embodiment of a support system for a seat backrest, the system includes a fixed frame and a support. A first flexible cable is operatively coupled to the frame and has a first end, a second end, and a cable body. A second flexible cable is operatively coupled to the frame and has a first end, a second end, and a cable body. An actuator is configured to move the first flexible cable and the second flexible cable relative to the support. Upon actuation of the actuator, contact between the support and the cable body of at least one of the first flexible cable and the second flexible cable moves the support from a first position to a second position.

In an embodiment of a lumbar support system for a seat backrest having a fixed frame, the system includes a lumbar support coupled to the fixed frame that is movable from a first position to a second position and a motor for moving the lumbar support. A threaded member is operatively associated with the motor such that the motor rotates the threaded member about an axis. A traveling member is operatively associated with the threaded member such that rotation of the threaded member translates the traveling member along the threaded member. The system further includes a flexible cable having a first end and a second end. The first end is coupled to the traveling member for movement therewith and the second end is coupled to the fixed frame such that translation of the traveling member in response to rotation of the threaded member moves the lumbar support element from the first position to the second position.

In an embodiment of an adjustable support system for a seat having a fixed frame, the adjustable support system includes a support movable from a first position to a second position relative to the frame. An actuator is coupled to the support and configured to move the support between the first and second positions. A member is operatively associated with and movable by the actuator and has a length. A flexible cable has a first end and a second end. The first end is coupled to the member for travel along the length of the member and the second end is coupled to the fixed frame such that movement of the member by the actuator causes the flexible cable to move the support between the first position and the second position.

Other aspects of the invention will become apparent by consideration of the detailed description and accompanying drawings.

BRIEF DESCRIPTION OF THE DRAWINGS

FIG. 11 is a side view of the lumbar support system of FIG. 6 with one lumbar support mechanism extended and the other lumbar support mechanism retracted.

FIG. 12 is a side view of the lumbar support system of FIG. 6 with one lumbar support mechanism retracted and the other lumbar support mechanism extended.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. And as used herein and in the appended claims, the terms "upper", "lower", "top", "bottom", "front", "back", and other directional terms are not intended to require any particular orientation, but are instead used for purposes of description only.

Figure 1:
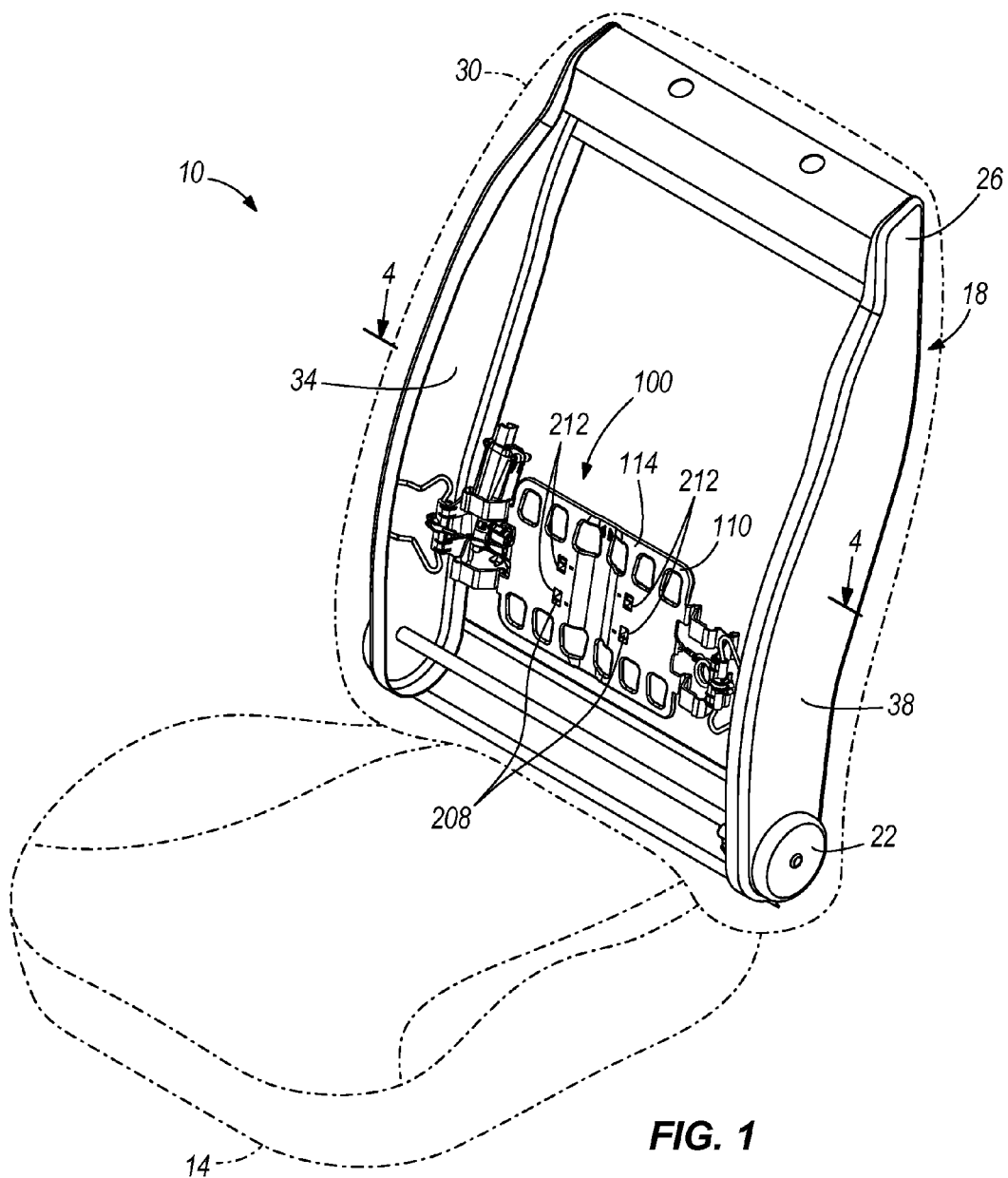
FIG. 1 is a perspective view of a vehicle seat including a lumbar support system.

FIG. 1 illustrates a seat 10, which for purposes of the following description may be any vehicle seat within the passenger compartment of a vehicle, though the seat 10 is not necessarily limited to vehicular applications. The seat 10 generally includes a seat bottom 14 (shown in phantom) and a seat backrest 18 for horizontal and vertical support, respectively, of a seat occupant. The seat backrest 18 is foldable relative to the seat frame at a pivot 22. A frame 26, which is covered by an overlying cushion 30 (shown in phantom), provides structural integrity for the backrest 18 and includes a pair of vertical support members 34, 38. A lumbar support system 100 extends between the vertical support members 34, 38 and is coupled thereto to permit adjustable lumbar support for the seated occupant.

As shown in FIG. 1, the lumbar support system 100 includes a lumbar support element, or basket 110, positioned medially between the vertical support members 34, 38. The basket 110 presents a generally flat front face 114 proximate the seat occupant functioning as a pressure surface against the occupant's lumbar region. Additional cushions, pads, or other materials not shown are situated over and within the seat backrest 18 and between the front face 114 and the seat occupant for added comfort.

Figure 2:
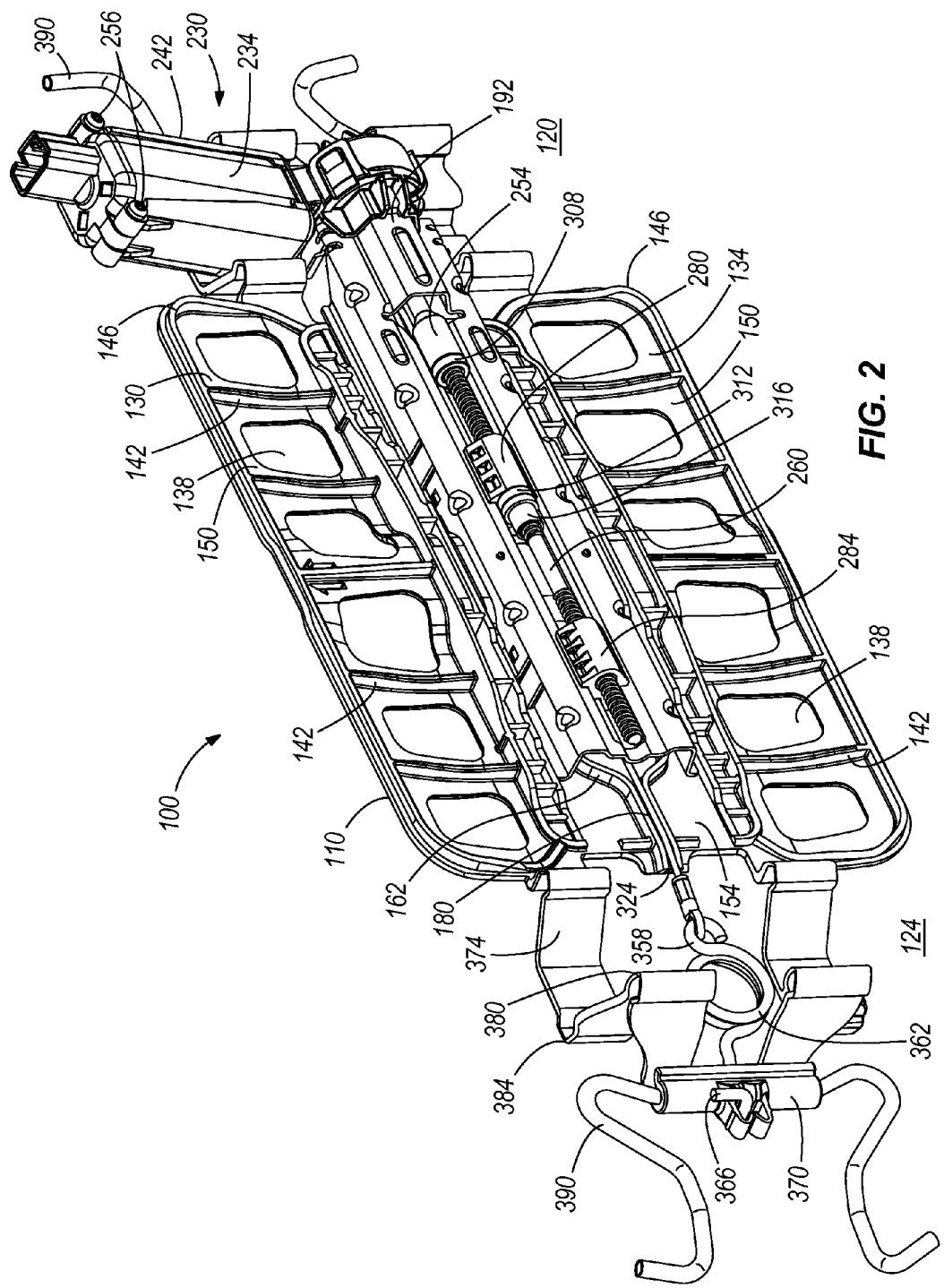
FIG. 2 is a perspective view of the lumbar support system of FIG. 1.
Figure 3:
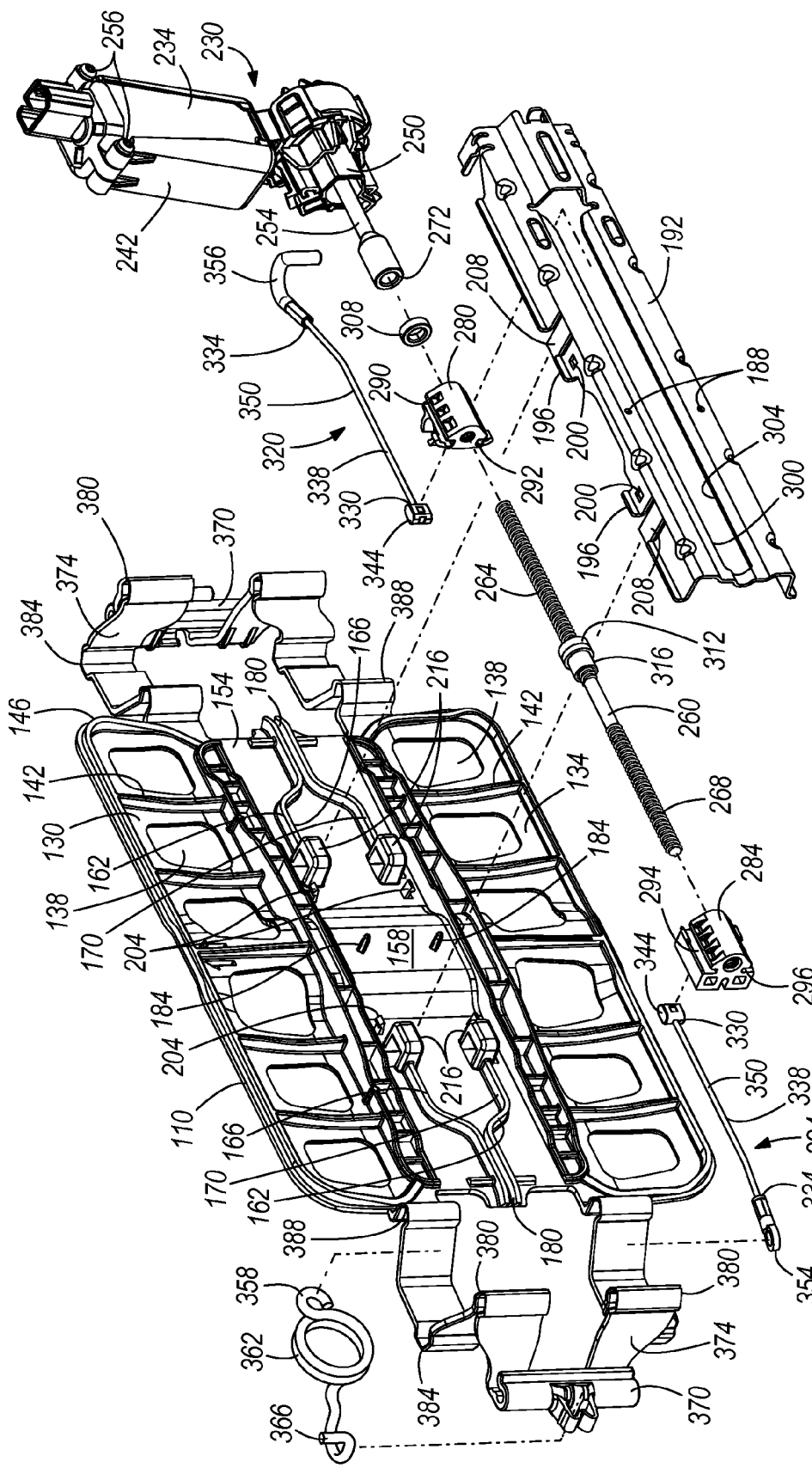
FIG. 3 is an exploded view of the lumbar support system of FIG. 1.

FIGS. 2 and 3 illustrate the lumbar support system 100 referenced with respect to a proximal end 120 (proximate to a drive assembly 230) and a distal end 124. The upper and lower portions 130, 134 of the basket 110 are formed to include a plurality of apertures 138 separated by stiffening ribs 142 generally interconnected by a border 146 on the rear face 150 of the basket 110. The central portion 154 of the basket 110 between the upper and lower portions 130, 134 includes a mounting face 158. The mounting face 158 supports two opposing sets of guides 162, each set comprising an upper and lower rail 166, 170 extending laterally along the central portion 154 and converging towards the proximal and distal ends 120, 124 of the basket 110, respectively, to form a cable channel 180, the purpose of which will be described below.

A pair of mounting pins 184 project rearward from the mounting face 158 for reception within mounting holes 188 of a rigid spindle rail 192. The spindle rail 192 includes a set of upper tabs 196 and lower tabs (not shown) each with a centrally located orifice 200. When positioned adjacent the mounting face 158, the tabs 196 engage opposing hooks 204, which, along with the mounting pins 184, align and secure the spindle rail 192 to the basket 110. Additional positioning and alignment is provided by the cooperation of projections 208 on either side of the upper and lower tabs 196 with slots 212 in the mounting face (see also FIG. 1). Structural integrity is maintained by contact between blocks 216 and the inside surface of the spindle rail 192.

Figure 3A:
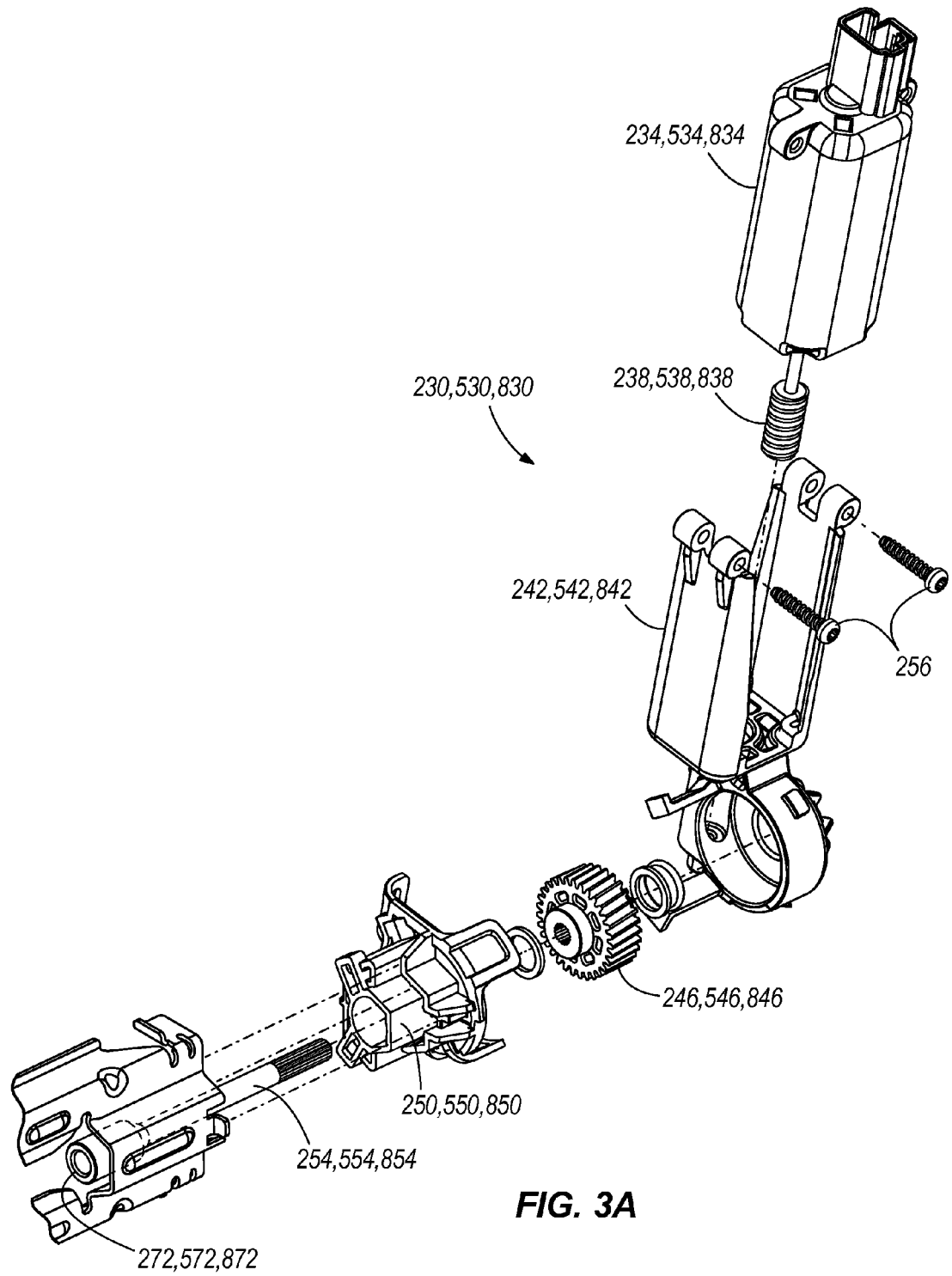
FIG. 3A is an exploded view of the drive assembly of the lumbar support system of FIG. 1.

Referring to FIGS. 2, 3, and 3A, a drive assembly, or actuator 230, includes a motor 234, a motor shaft with a pinion 238, a housing 242, a worm gear 246, a cap 250, and a drive shaft 254. The motor 234, secured to the housing 242 with fasteners 256, is preferably a D.C. reversible motor but can be any type of reversible motor suitable for the application and can further be varied in size and power as necessary. The worm gear 246, operatively engaged with the pinion 238 of the motor shaft, permits an orthogonal change of direction of the power applied to the drive shaft 254 and an increase in output torque from the motor 234. The gear 246 is contained within the housing 242, which also couples the motor 234 to the remaining drive assembly components. The splined drive shaft 254 mates with the worm gear 246 for co-rotation and transfer of power during operation. The cap 250, attached to the housing 242, provides additional protection for the worm gear 246 and drive shaft 254 and secures the motor 234 to the spindle rail 192.

Coupled to the drive shaft 254 and spanning a substantial portion of the spindle rail 192 is a threaded member, or spindle 260. The spindle 260 has proximal and distal threaded ends 264, 268. As illustrated, the proximal threads are right-hand threads and the distal threads are left-hand threads, though the handedness can be reversed in alternative embodiments. The proximal threaded end 264 is rotationally secured to and received within an opening 272 defined within the end of the drive shaft 254 such that the spindle 260 rotates with the drive shaft 254 upon actuation of the motor 234. Positioned about each threaded end 264, 268 of the spindle 260 is a traveling member, or slider, i.e., a proximal slider 280 and a distal slider 284. Each slider 280, 284 has an internally threaded body for engagement with the spindle 260 and opposing grooves 290, 292, 294, 296 that mate with opposing edges 300, 304 formed as part of the spindle rail 192. The oppositely threaded spindle ends 264, 268 together with the groove/edge interface of the sliders 280, 284 with the spindle rail 192 cause opposed translational motion of the sliders 280, 284 along the spindle 260 upon spindle rotation. A bumper 308 located adjacent the drive shaft 254 provides the limit of one end of travel for the proximal slider 280. A second bumper 312 adjacent a centrally positioned stop 316 establishes a second limit of travel and defines the range of movement for the proximal slider 280.

Proximal and distal flexible cables 320, 324 are coupled to the proximal slider 280 and the distal slider 284, respectively. Each cable 320, 324 includes a first end 330, a second end 334, and a cable body 338. The first end 330 has a connector 344 that fits within the body of the respective slider 280, 284 for movement therewith. The cable body 338 of each cable 320, 324 extends from the first end 330 and defines an intermediate section 350, a portion of which is substantially positioned within each respective channel 180. The intermediate section 350 terminates at the second end 334 coupled to a coil end fitting 354 (e.g., cable 324), or alternatively, to a hook fitting 356 (e.g., cable 320). The coil end fitting 354 is adapted to engage a first end 358 of a spring 362, such as a torsion spring. Though shown associated with the distal end 124, the spring 362 is operable with one or on both of the respective second ends 334 of the distal and proximal cables 320, 324. The spring 362 includes a second end 366 configured for attachment to the hook end 370 of a hinge 374 and permits a limited amount of flexion of the lumbar support system 100 both when an occupant is first seated and during operation to enhance occupant comfort. The hook fitting 356 of cable 320 wraps around a portion of the hook end 370 of the opposite hinge 374.

Figure 4:
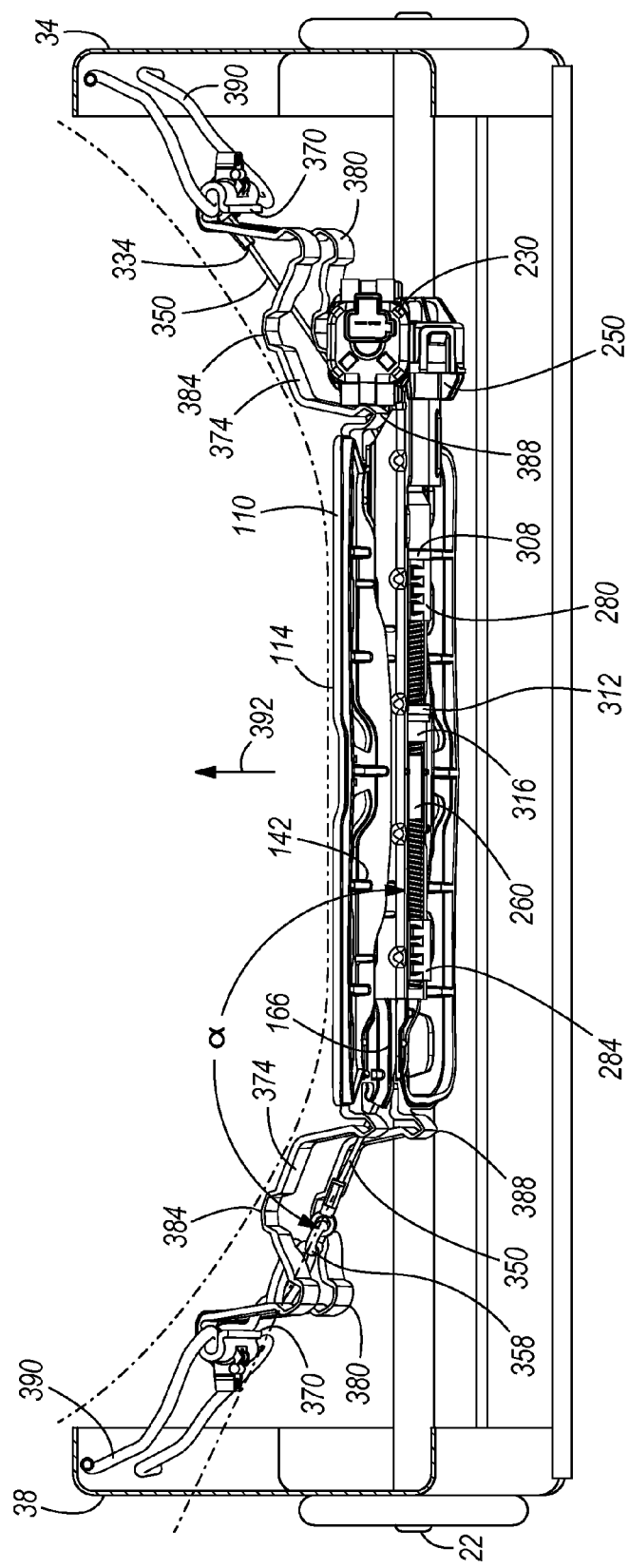
FIG. 4 is a section view from line 4-4 of FIG. 1 of the lumbar support system in a retracted position.
Figure 5:
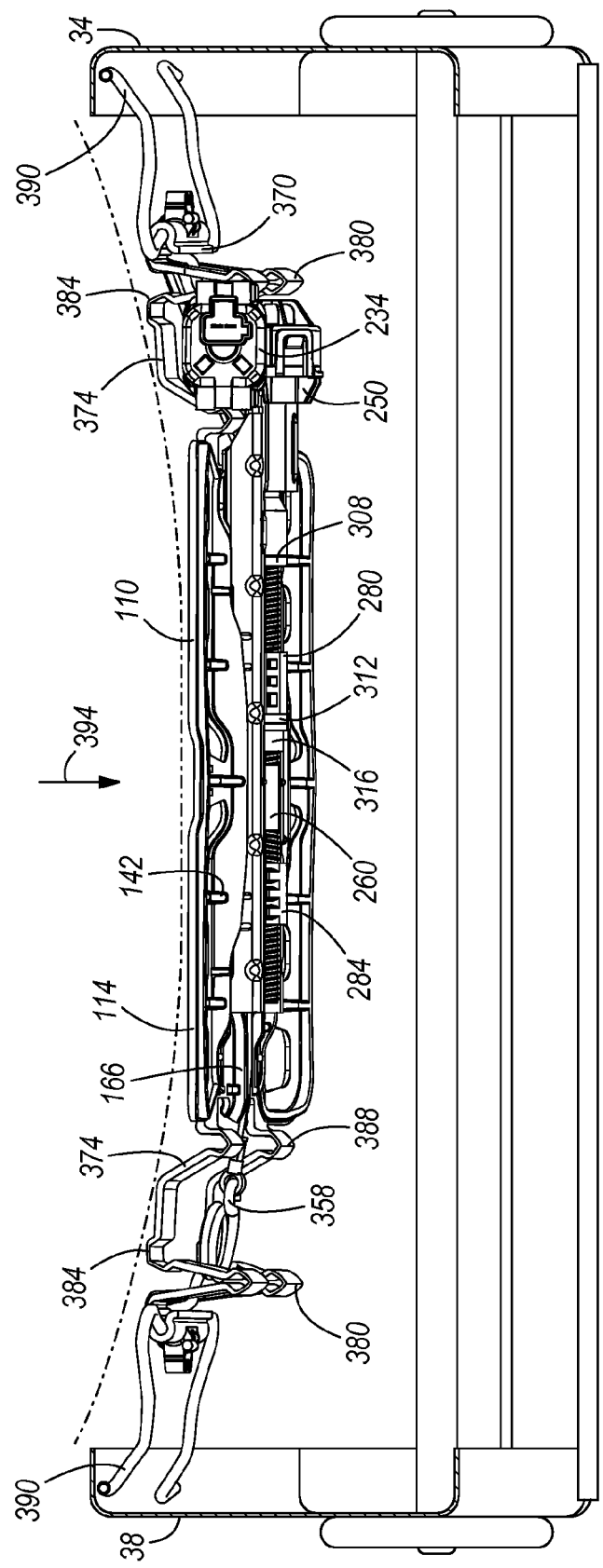
FIG. 5 is a section view from line 4-4 of FIG. 1 of the lumbar support system in an extended position.

The hinge 374 is formed as a "living" hinge that adjoins the basket 110 at both the upper and lower portions 130, 134 opposite the hook end 370. As illustrated, the hinge 374 includes first, second, and third pivots points 380, 384, 388, although fewer or more than three pivots points are also within the present scope. As shown in FIGS. 2, 4, and 5, the pivot points 380, 384, 388 are positioned to preclude interference with the motor 234 during the course of travel of the basket 110. The hinge 374 and the basket 110 are preferably formed as a unitary piece. Alternatively, the hinge 374 can be a separate piece secured to the basket 110 in a manner known to those of skill in the art. The hook end 370 of the hinge 374 is formed to fit over a coupling element in the form of an attachment wire 390 fixed to a respective vertical support member 34, 38 of the frame 26 (see FIG. 1).

In operation, a seat occupant activates the power actuator 230 using an electrically actuated switch located preferably adjacent the seat backrest 18 or the seat bottom 14. Referring to FIGS. 4 and 5, the lumbar support system can be in any position between a fully retracted position (FIG. 4) and a fully extended position (FIG. 5) when the actuator 230 is initiated. Upon energizing the motor 234, engagement of the worm gear 246 rotates the drive shaft 254, concurrently turning the spindle 260. If the lumbar support system 100 is activated to retract the basket 110, the spindle 260 rotates in a first direction. If the lumbar support system 100 is activated to extend the basket 110, the spindle 260 rotates in a second, opposite direction. Activation in either direction is user selectable with the electrically actuated switch. Due to the interaction of the grooves 290, 292, 294, 296 of the sliders 280, 284 with the edges 300, 304 of the spindle rail 192, rotation of the spindle 260 translates the sliders 280, 284, one of which travels in the proximate direction (120) and the other of which travels in the distal direction (124).

If the occupant desires extension of the basket 110 to provide more lumbar support, clockwise rotation of the spindle 260 (viewed from the distal direction 124) causes the proximal slider 280 to travel distally and the distal slider 284 to travel proximally along the spindle 260, i.e., the sliders 280, 284 and their respective attached cables 320, 324 approach each other. As the sliders 280, 284 converge, portions of the intermediate sections 350 of each cable slide within their respective channels 180, contacting the basket 110. This contact results in a force against the basket 110 directing the basket frontward, as shown in FIG. 4 by arrow 392. When the proximal slider 280 contacts the bumper 312, the motor 234 stops, which ceases rotation of the spindle 260. Other methods of de-energizing the motor 234 at a certain point of travel, commonly known to those of skill in the art, are also possible for use with the lumbar support system 100.

The hinges 374, which are anchored to the attachment wire 390 at the hook end 370, facilitate movement of the basket 110 by flexing to provide a smooth motion throughout the range of travel. As shown in FIG. 5, the pivot points 380, 384, 388 permit the collapse of the hinge 374 around the motor 234 at full extension. The attachment wires 390, each secured to a respective vertical support 30, 34 of the frame 26, rotate as necessary with the movement of the lumbar support system 100.

If the occupant desires retraction of the basket 110 to lessen the amount of lumbar support, counterclockwise rotation of the spindle 260 causes the proximal slider 280 to travel proximally and the distal slider 284 to travel distally along the spindle 260, i.e., the sliders 280, 284 and their respective attached cables 320, 324 separate. As the sliders 280, 284 move farther apart, pressure against the basket 110 from the intermediate sections 350 of the cables lessens and the basket 110 retracts to the rear in response, as shown in FIG. 5 by arrow 394. When the slider 280 contacts the bumper 308, the motor 234 stops as previously described.

During the course of travel of the basket 110, the cables 320, 324 remain disposed in substantially the same plane from refraction to extension and back, and the angle α (see FIG. 4) between the first end 330 and the second end 334 of each cable 320, 324 remains obtuse.

Figure 6:
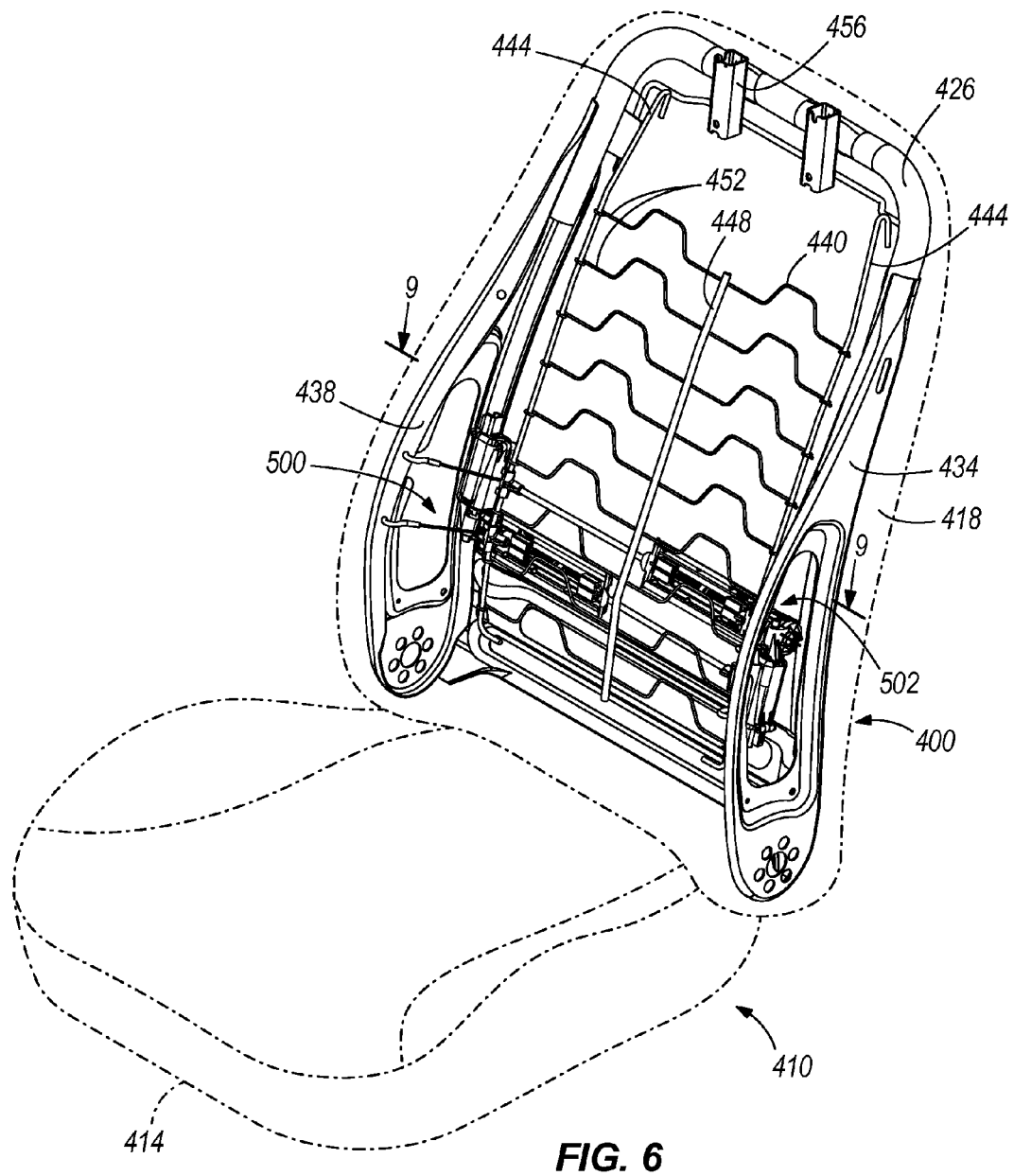
FIG. 6 is a perspective view of a vehicle seat including another lumbar support system.

FIG. 6 illustrates an alternative version of a lumbar support system 400 for a seat 410, the general features of which have been previously described. The seat 410 includes a seat bottom 414 (shown in phantom), a foldable seat backrest 418, and a frame 426 with vertical support members 434, 438. A lumbar support element in the form of a contour mat or flexmat 440 includes lateral outer wires 444, a central wire 448, and a plurality of transverse wires 452 extending between the lateral outer wires 444. The frame 426 can further includes a pair of receptacles 456 for receiving the supports of a headrest (not shown). As illustrated, the lumbar support system 400 includes a pair of independently adjustable lumbar support mechanisms 500, 502.

Figure 7:
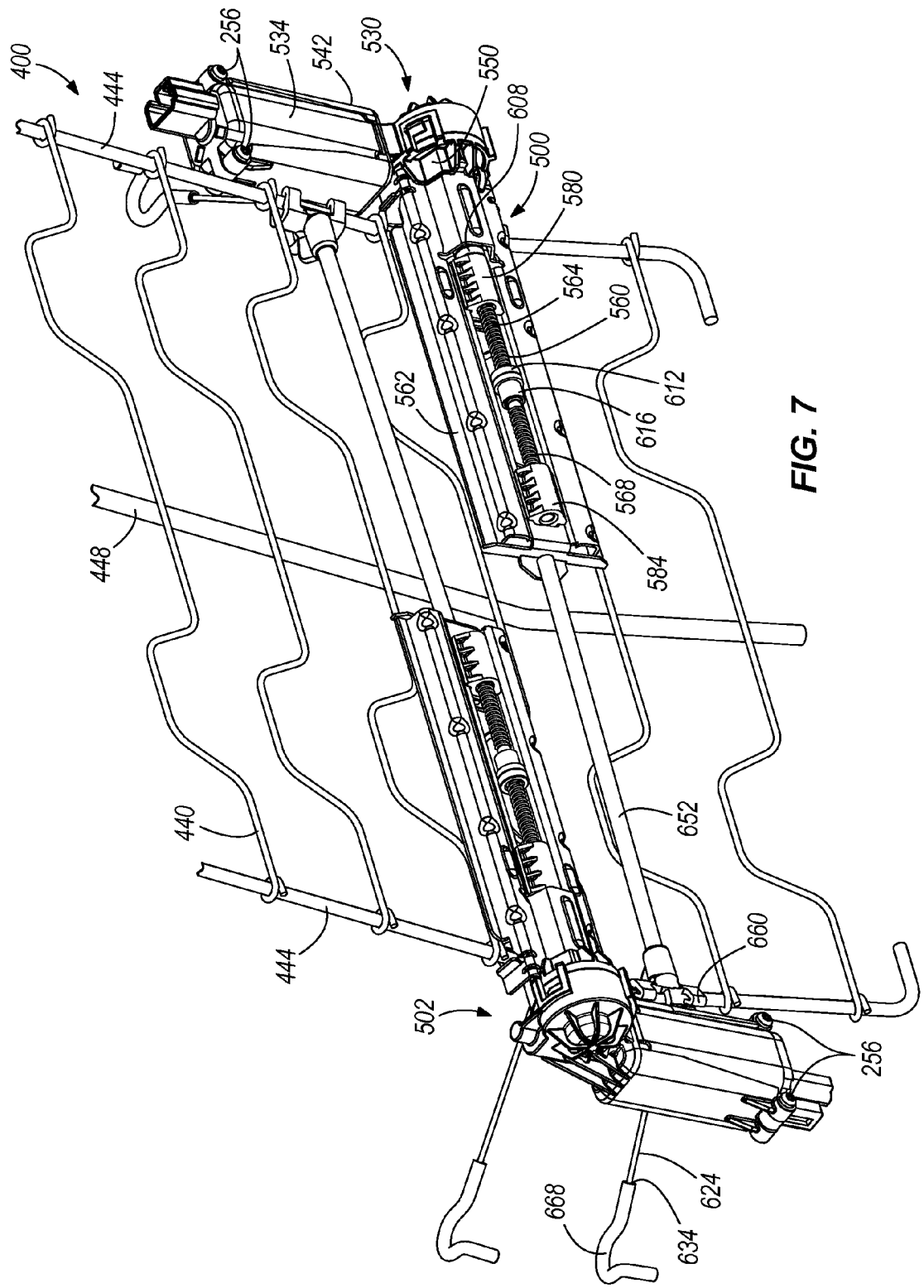
FIG. 7 is a perspective view of the lumbar support system of FIG. 6.
Figure 8:
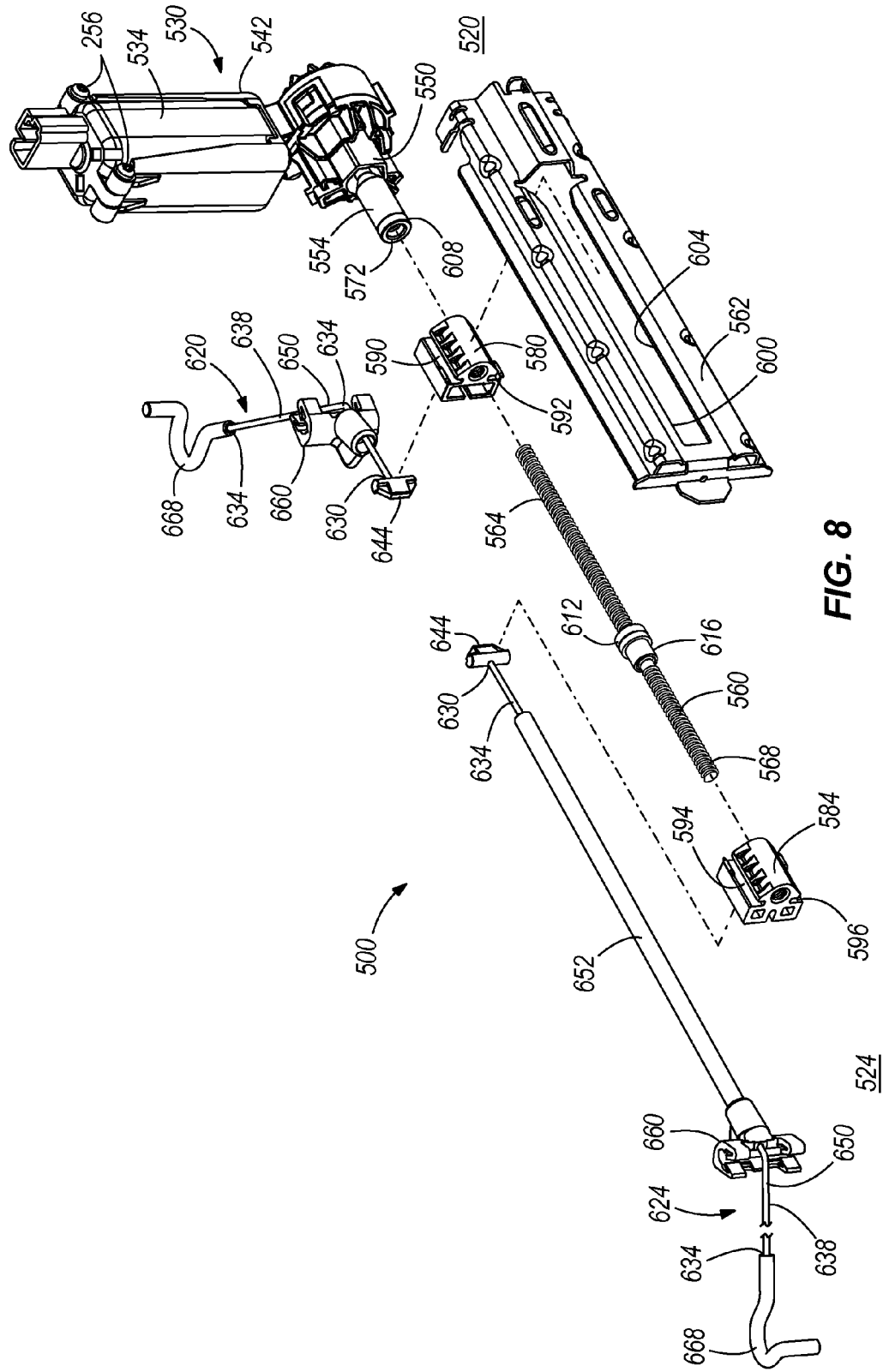
FIG. 8 is an exploded view of a lumbar support mechanism of the lumbar support system of FIG. 6.

FIG. 7 illustrates the lumbar support system 400, with FIG. 8 detailing the components of a proximal adjustable lumbar support mechanism 500 referenced with respect to a proximal end 520 and a distal end 524.

A drive assembly, or actuator 530, is substantially as shown in FIG. 3A and includes a motor 534, a motor shaft with a pinion 538, a housing 542, a worm gear 546, a cap 550, and a drive shaft 554 that interact as previously described with respect to the system of FIG. 1. A threaded member, or spindle 560, is coupled to the drive shaft 554 and spans a substantial portion of a spindle rail 562. The spindle 560 has right-hand proximal threads and left-hand distal threads. The proximal threaded end 564 is rotationally secured to and received within an opening 572 defined by the end of the drive shaft 554 and rotates with the drive shaft 554 upon actuation of the motor 534. Positioned about each threaded end 564, 568 of the spindle 560 is a slider, i.e., a proximal slider 580 and a distal slider 584, respectively, each with an internally threaded body for engagement with the spindle 560. Opposing grooves 590, 592, 594, 596 mate with opposing edges 600, 604 formed as part of the spindle rail 562 to cause opposite translational motion of the sliders 580, 584 during operation. A bumper 608 located adjacent the drive shaft 554 provides a first travel limit for the proximal slider 580, and a second bumper 612 adjacent a centrally positioned stop 616 provides a second travel limit, the limits defining the range of movement for the proximal slider 580.

Proximal and distal cables 620, 624 are coupled to the proximal slider 580 and the distal slider 584, respectively. Each cable 620, 624 includes a first end 630, a second end 634, and a cable body 638. The first end 630 of each cable 620, 624 includes a connector 644 that couples to the body of a respective slider 580, 584 for movement therewith. The cable body of each cable 620, 624 extends from the first end 630 and defines an intermediate section 650. The intermediate section 650 of the distal cable 624 of the proximal lumbar support mechanism 500, as illustrated in FIG. 8, is longer than the intermediate section 650 of the proximal cable 620 of the same lumbar support mechanism. This longer intermediate section 650 of the cable 624 is situated within a rigid sleeve 652 having an inside diameter larger than the diameter of the cable 624 to permit free movement of the cable 624 within. Portions of the intermediate sections 650 of the proximal and distal cables 620, 624 each pass through and are contained by a clip 660 coupling the proximal and distal cables 620, 624, and thereby the lumbar support mechanism 500, to the flexmat 440 through the outer wires 444. Each intermediate section 650 terminates at the second end 634, which is coupled to a hook fitting 668, itself secured to a respective vertical support member 434, 438 of the frame 426. Referring to FIG. 7, the distal lumbar support mechanism 502 is a mirror image of the proximal lumbar support mechanism 500.

The seat occupant can optionally select to activate the proximal lumbar support mechanism 500 or the distal lumbar support mechanism 502 in the same manner. Alternatively, the seat occupant may be able to activate both proximal and distal mechanisms 500, 502 with the same switch. The following operational description will focus on the support mechanism 500 but is equally applicable to the support mechanism 502.

Figure 9:
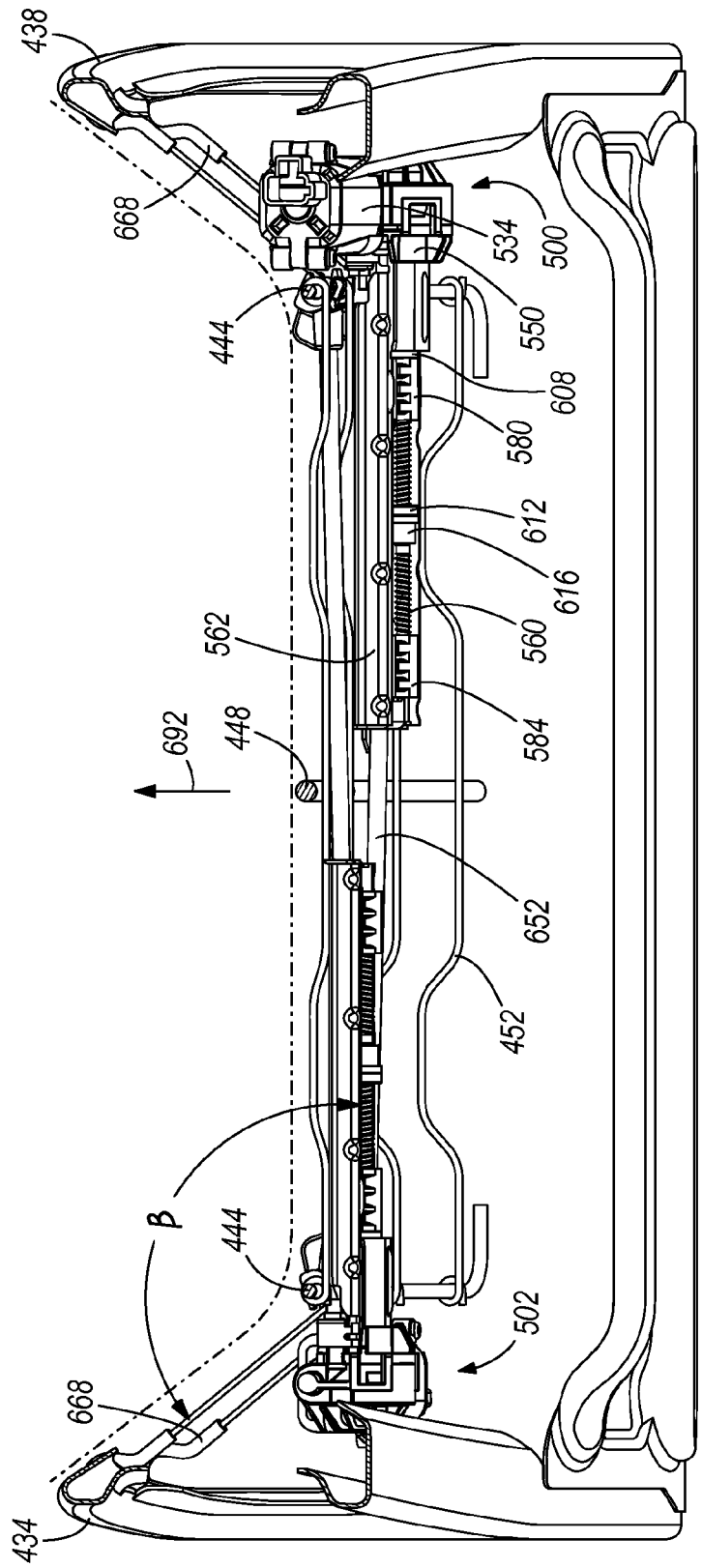
FIG. 9 is a section view from line 9-9 of FIG. 6 of the lumbar support system in a retracted position.
Figure 10:
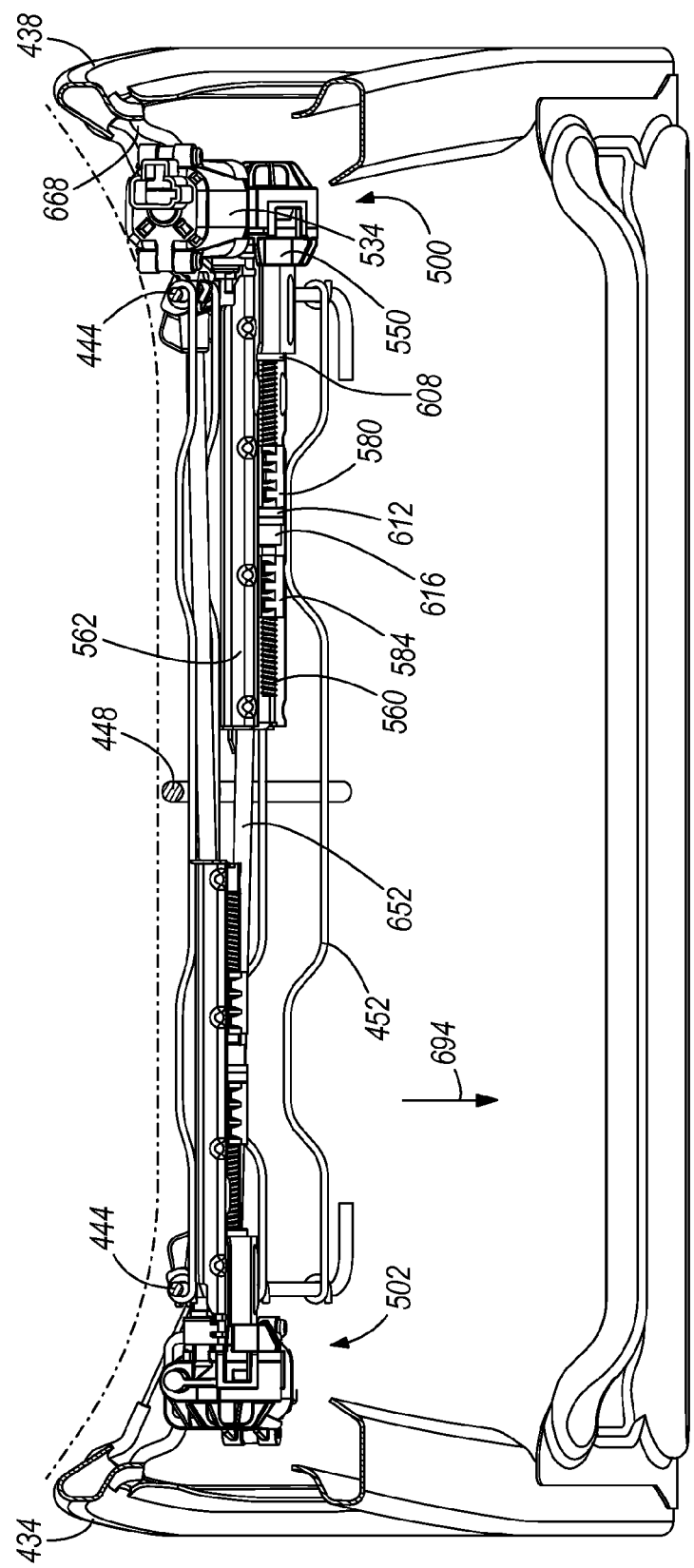
FIG. 10 is a section view from line 9-9 of FIG. 6 of the lumbar support system in an extended position.

A seat occupant activates the actuator 530 for the proximal lumbar support mechanism 500 using an electrically actuated switch located preferably adjacent the seat backrest 418 or the seat bottom 414. Referring to FIGS. 9 and 10, the mechanism 500 can be in any position between a fully retracted position (FIG. 9) and a fully extended position (FIG. 10) when the actuator 530 is initiated. Upon energizing the motor 534, engagement of the worm gear 546 rotates the drive shaft 554, concurrently turning the spindle 560. If the lumbar support mechanism 500 is activated to retract, i.e., provide less support, the spindle 560 rotates in a first direction. If the lumbar support mechanism 500 is activated to extend, i.e., provide more support, the spindle 560 rotates in the opposite direction. Activation in either direction is user selectable with the electrically actuated switch. As with the embodiment of FIG. 1, rotation of the spindle 560 translates the sliders 580, 584, the grooves 590, 592, 594, 596 of which interact with the edges 600, 604 of the spindle rail 562 such that one slider 580, 584 travels in the proximate direction (520) and the other slider 580, 584 travels in the distal direction (524).

To extend the lumbar support mechanism 500, the seat occupant activates the mechanism for clockwise rotation of the spindle 560 (viewed from the distal direction 524), which causes the proximal slider 580 to travel distally and the distal slider 584 to travel proximally along the spindle 560, i.e., the sliders 580, 584 and their respective attached cables 620, 624 approach each other. As the sliders 580, 584 converge, the intermediate sections 650 contact the lateral outer wires 444, forcing the region of the flexmat 440 spanned by the mechanism 500 frontward, as shown in FIG. 9 by arrow 692. When the proximal slider 580 contacts the bumper 612, the motor 534 stops, which ceases rotation of the spindle 560. As shown in FIGS. 9 and 10, the hook ends 668 allow for coupled rotation about the vertical support members 434, 438 to permit smooth movement of the lumbar support mechanism 500 as it travels forward. Although not shown, springs coupled with one or both of the cables 620, 624 in series can permit a limited amount of flexion and provide "give" to an occupant to enhance the comfort of the device.

To retract the lumbar support mechanism 500 to lessen the amount of lumbar support, the seat occupant activates the mechanism 500 for counterclockwise rotation of the spindle 560, which causes the proximal slider 580 to travel proximally and the distal slider 584 to travel distally, i.e., the sliders 580, 584 and their respective attached cables 620, 624 separate. As the sliders 580, 584 grow farther apart, pressure against the lateral outside wires 444 from the intermediate sections 650 of the cables 620, 624 lessens and the flexmat 440 retracts rearward in response, as shown in FIG. 10 by arrow 694. When the proximal slider 580 contacts the bumper 608, the motor 534 stops, as previously described.

The lumbar support mechanisms 500, 502 are independently operational, and both can be operated through the full extent of their range. For example, both lumbar support mechanisms 500, 502 can be extended, both retracted, or one can be fully or partially retracted while the other is fully or partially extended. Referring to FIG. 11, the proximal lumbar support mechanism 500 is in the fully extended position while the distal lumbar support mechanism 502 is in the fully retracted position (the motor of mechanism 502 is absent for viewing). As shown in FIG. 12, the proximal lumbar support mechanism 500 is in the fully refracted position while the distal lumbar support mechanism 502 is in the fully extended position. Any degree of independent extension/retraction of the mechanisms 500, 502 is possible between the range illustrated in FIGS. 11 and 12. The vertical distance $D_1$ separating the mechanisms 500, 502 is approximately 50 mm, but can be of a greater or lesser magnitude for a particular application.

As with the lumbar support system 100, during the course of travel of the contour mat 440, the cables 620, 624 remain disposed in substantially the same plane from retraction to extension and back, and the angle β (see, e.g., FIG. 9) between the first end 630 and the second end 634 of each cable 620, 624 remains obtuse.

Figure 13:
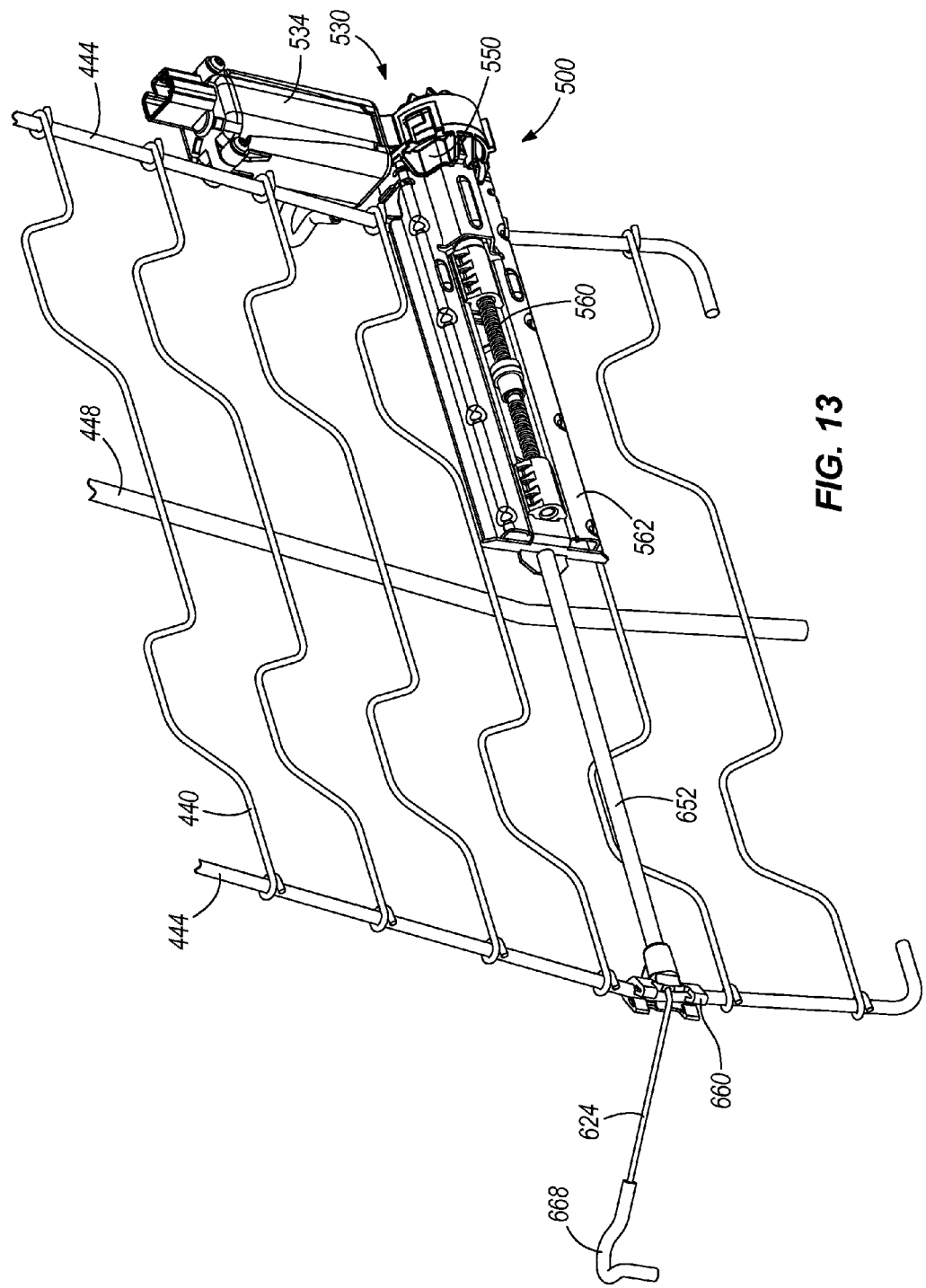
FIG. 13 is a perspective view of another lumbar support system with a single lumbar support mechanism.

In some applications, a single lumbar support mechanism, e.g., mechanism 500, can be used alone, as shown in FIG. 13, with operation of the mechanism substantially as previously described.

Figure 14:
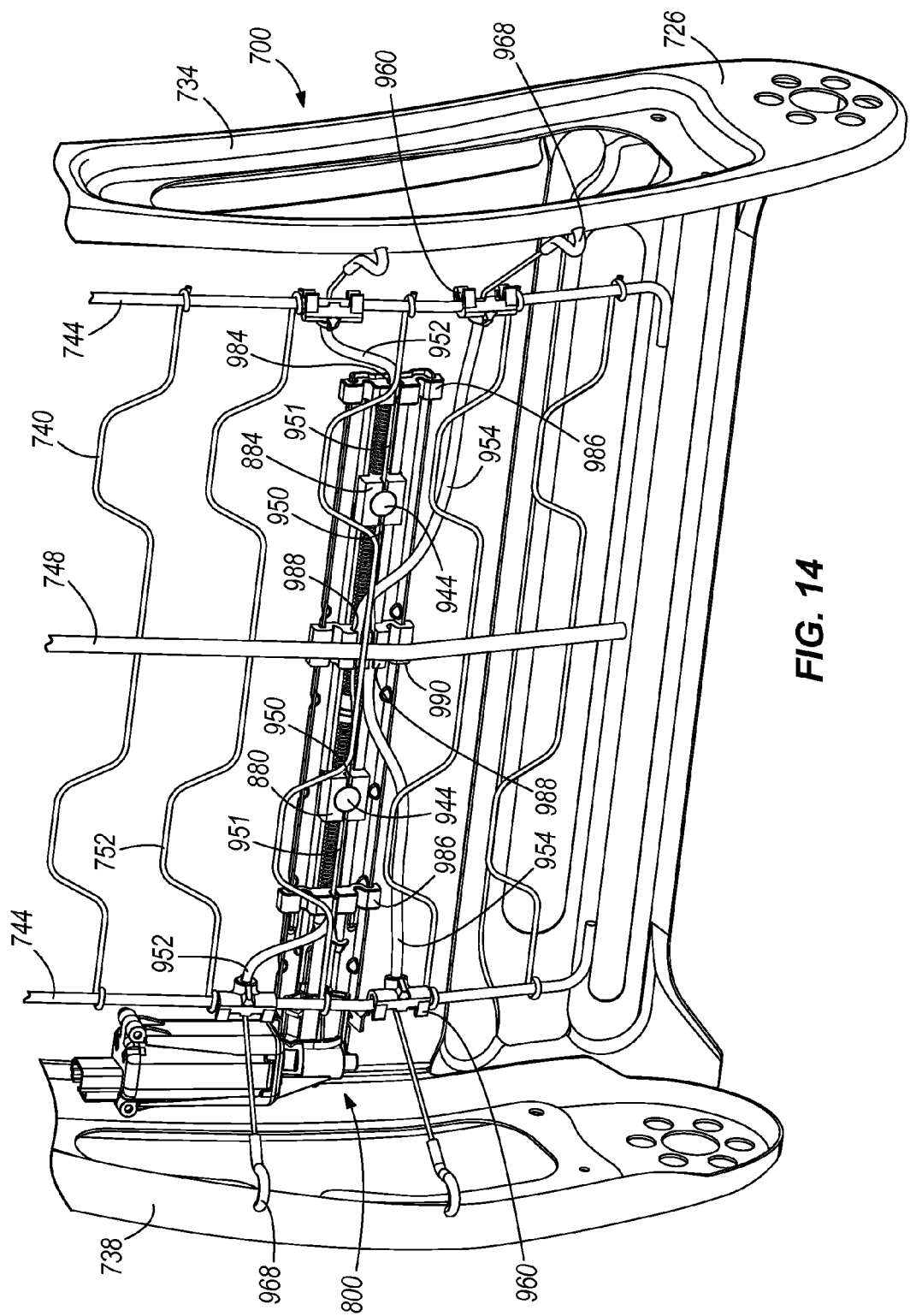
FIG. 14 is a partial perspective view of a vehicle seat including another lumbar support system.

FIG. 14 illustrates an alternative version of a lumbar support system 700 for a seat, the general features of which have been previously described. The seat includes a frame 726 with vertical support members 734, 738. A lumbar support element in the form of a contour mat or flexmat 740 includes lateral outer wires 744, a central wire 748, and a plurality of transverse wires 752 extending between the lateral outer wires 744. The lumbar support system 700 includes an independently adjustable lumbar support mechanism 800.

Figure 15:
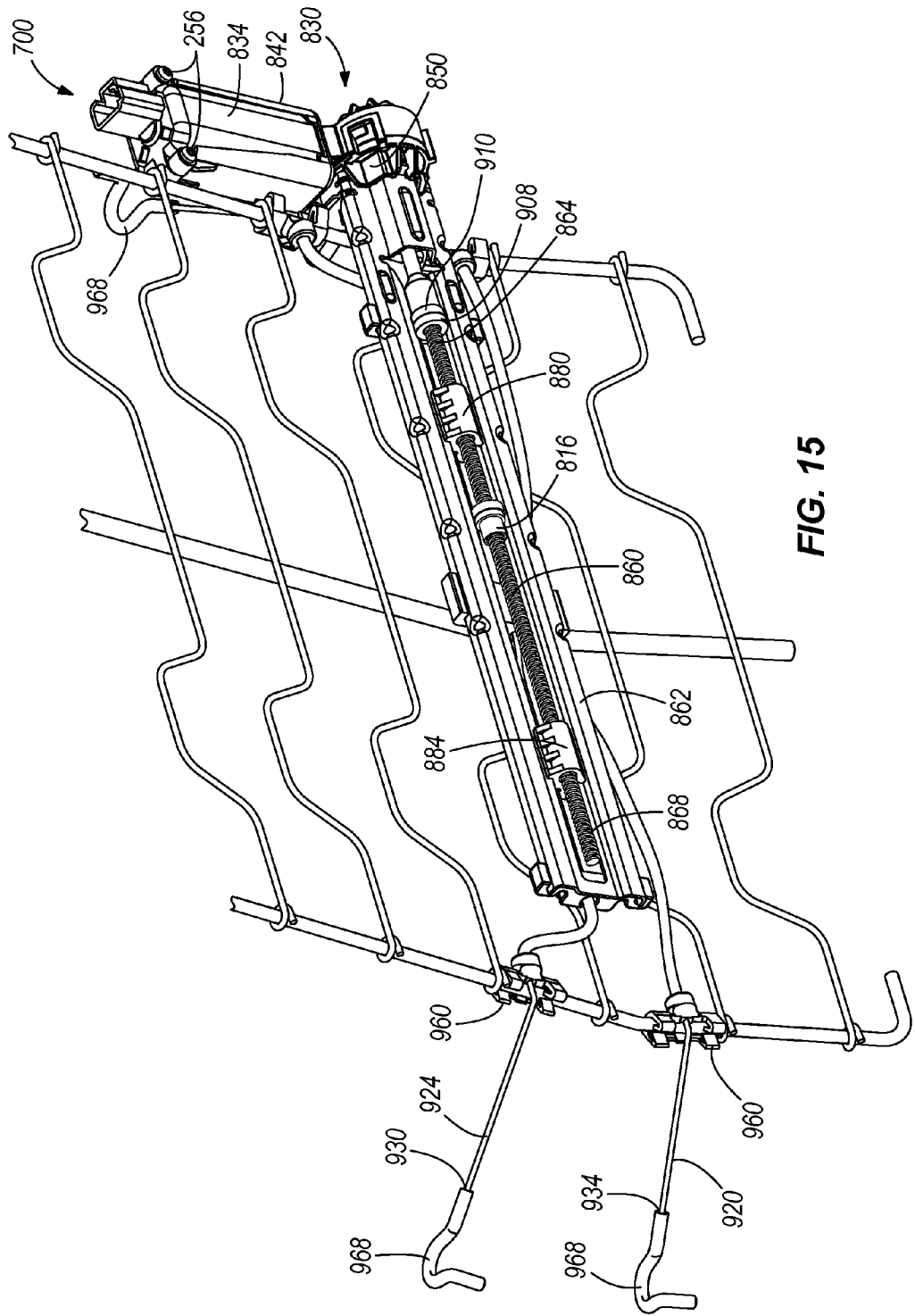
FIG. 15 is a perspective view of the lumbar support system of FIG. 14.
Figure 16:
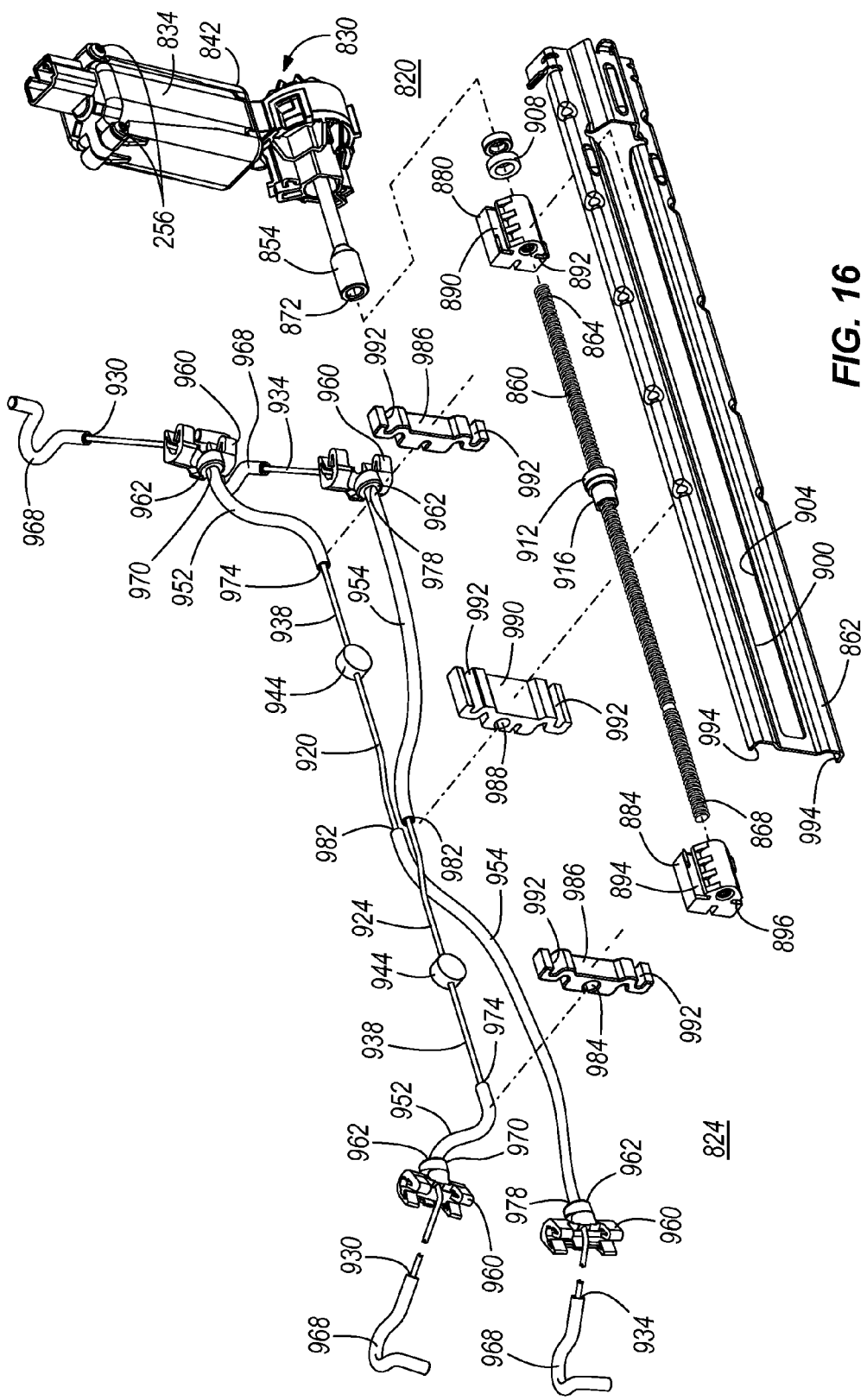
FIG. 16 is an exploded view of a lumbar support mechanism of the lumbar support system of FIG. 14.

FIG. 15 illustrates the lumbar support system 700, with FIG. 16 detailing the components of the adjustable lumbar support mechanism 800 referenced with respect to a proximal end 820 and a distal end 824.

A drive assembly, or actuator 830, is substantially as shown in FIG. 3A and includes a motor 834, a motor shaft with a pinion 838, a housing 842, a worm gear 846, a cap 850, and a drive shaft 854 that interact as previously described with respect to the system of FIG. 1. A threaded member, or spindle 860, is coupled to the drive shaft 854 and spans a substantial portion of a spindle rail 862. The spindle 860 has right-hand proximal threads and left-hand distal threads. The proximal threaded end 864 is rotationally secured to and received within an opening 872 defined by the end of the drive shaft 854 and rotates with the drive shaft 854 upon actuation of the motor 834. Positioned about each threaded end 864, 868 of the spindle 860 is a slider, i.e., a proximal slider 880 and a distal slider 884, respectively, each with an internally threaded body for engagement with the spindle 860. Opposing grooves 890, 892, 894, 896 mate with opposing edges 900, 904 formed as part of the spindle rail 862 to cause opposite translational motion of the sliders 880, 884 during operation. Bumper 908 located adjacent the drive shaft 854 provide a first travel limit for the proximal slider 880, and a bumper 912 adjacent a centrally positioned stop 916 provides a second travel limit, the limits defining the range of movement for the proximal slider 880.

A first cable 920 is coupled to the proximal slider 880 and a second cable 924 is coupled to the distal slider 884. Each cable 920, 924 includes a first terminus 930, a second terminus 934, and a cable body 938. A connector 944 securely couples the body of a respective slider 880, 884 to each respective cable body 938 such that no relative motion exists between the connector 944 and its attached cable 938 (see also FIG. 14). The cable body 938 of each cable 920, 924 extends from the first terminus 930 to the second terminus 934 and is partitioned into a first intermediate section 950 ending on one side of a respective connector 944 and a second intermediate section 951 ending on the other side of the respective connector 944 (see FIG. 14). Portions of each cable body 938 are operationally situated within first and second sleeves 952, 954 having an inside diameter larger than the diameter of the cable bodies 938 to permit free movement of each cable within. Portions of the cable bodies 938 of each cable 920, 924 near each terminus 930, 934 pass through and are contained by a clip 960 coupling the first and second cables 920, 924, and thereby the lumbar support mechanism 800, to the flexmat 740 through the outer wires 744. As illustrated, the couplings 962 of the clips 960 are positioned such that the wire enters the clip 960 in a direction substantially parallel to the spindle 860, although the couplings 962 of one or more of the clips 960 can alternatively be angled toward the spindle 860 to permit a more direct path for the cables 920, 924. The first and second termini 930, 934 are each coupled to a hook fitting 968, itself secured to a respective vertical support member 734, 738 of the frame 726.

Referring to FIGS. 14 and 16, each of sleeves 952 includes an outer end 970 and an inner end 974. Each of sleeves 954 includes an outer end 978 and an inner end 982. The outer ends 970, 978 of each sleeve connect to each respective clip 960. The inner ends 974 of the sleeves 952 each fit and are secured within a recess 984 of a lateral fitting 986. The inner ends 982 of the sleeves 954 each fit and are secured within a recess 988 of a central fitting 990. Each fitting 986, 990 includes upper and lower channels 992 that fit over the top and bottom rims 994 of the rail 862.

A seat occupant activates the actuator 830 for the lumbar support mechanism 800 using an electrically actuated switch located preferably adjacent the seat backrest or the seat bottom. Referring to FIGS. 17-21, the mechanism 800 can be disposed in a first position to provide more support in an upper lumbar region than a lower lumbar region (FIGS. 18-19) or disposed in a second position to provide more support in a lower lumbar region than an upper lumbar region (FIGS. 20-21) when the actuator 830 is initiated.

Upon energizing the motor 834, engagement of the worm gear 846 rotates the drive shaft 854 (see FIG. 3A), concurrently turning the spindle 860. If the lumbar support mechanism 800 is activated to the first position, the spindle 860 rotates in a first direction. If the lumbar support mechanism 800 is activated to the second position, the spindle 860 rotates in the opposite direction. Activation in either direction is user selectable with the electrically actuated switch. As with the previous embodiments, rotation of the spindle 860 translates the sliders 880, 884, the grooves 890, 892, 894, 896 of which interact with the edges 900, 904 of the spindle rail 862 such that one slider 880, 884 travels in the proximate direction (820) and the other slider 880, 884 travels in the distal direction (824).

Figure 17:
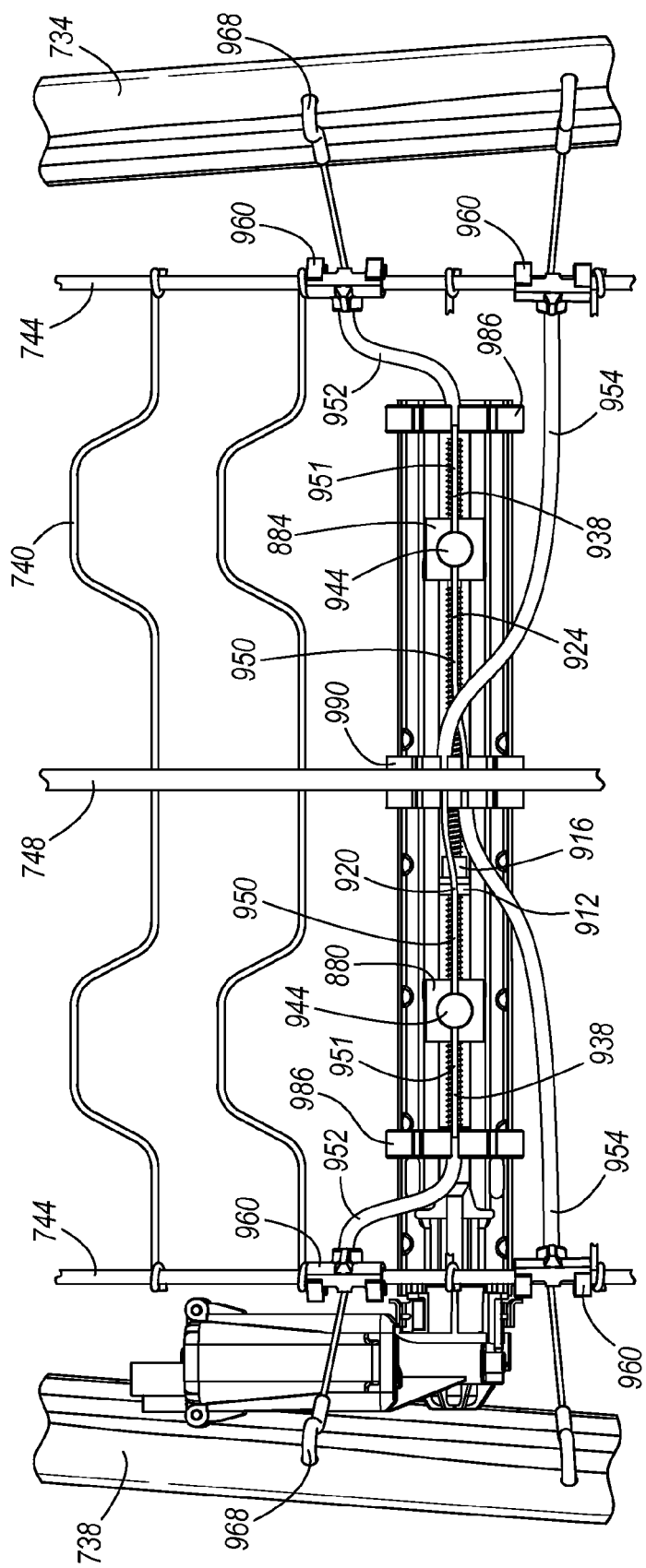
FIG. 17 is a partial front view of the lumbar support system of FIG. 14.
Figure 18:
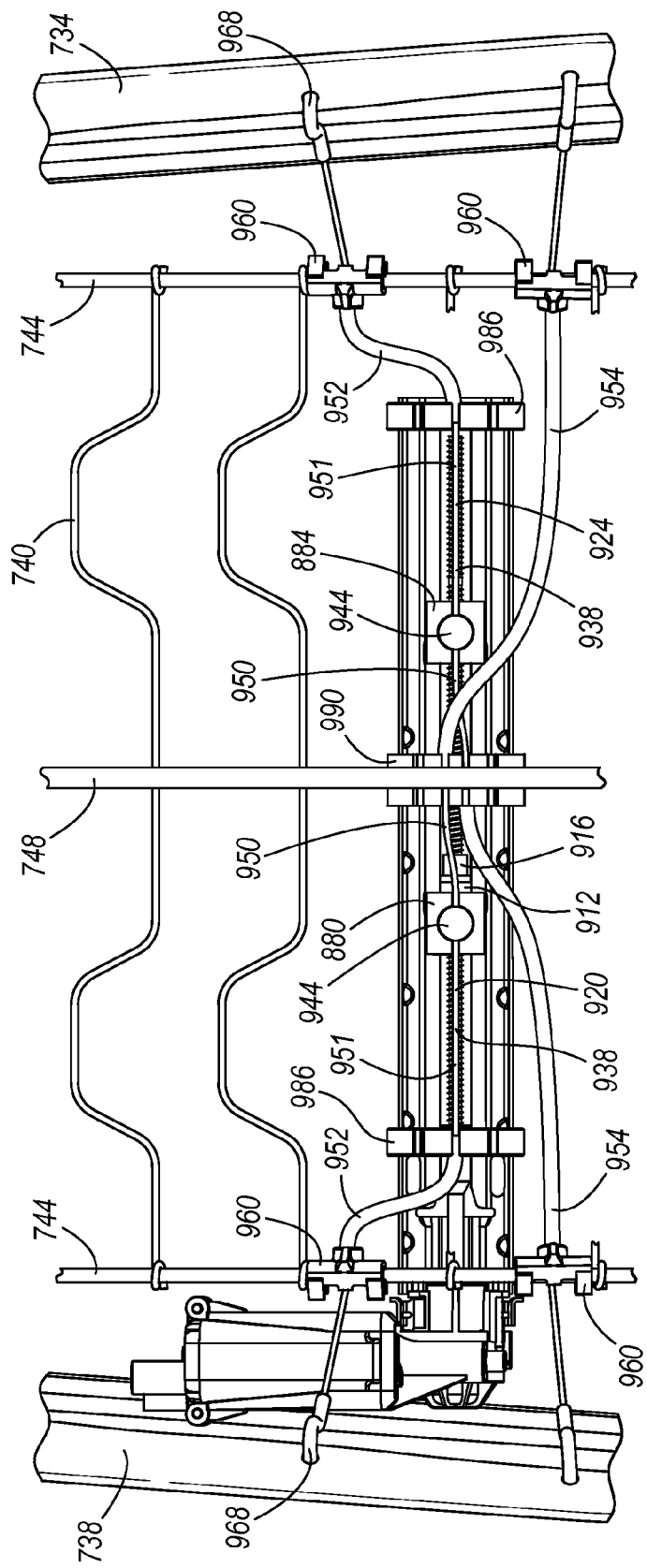
FIG. 18 is a partial front view of the lumbar support system of FIG. 14 in a first position.
Figure 19:
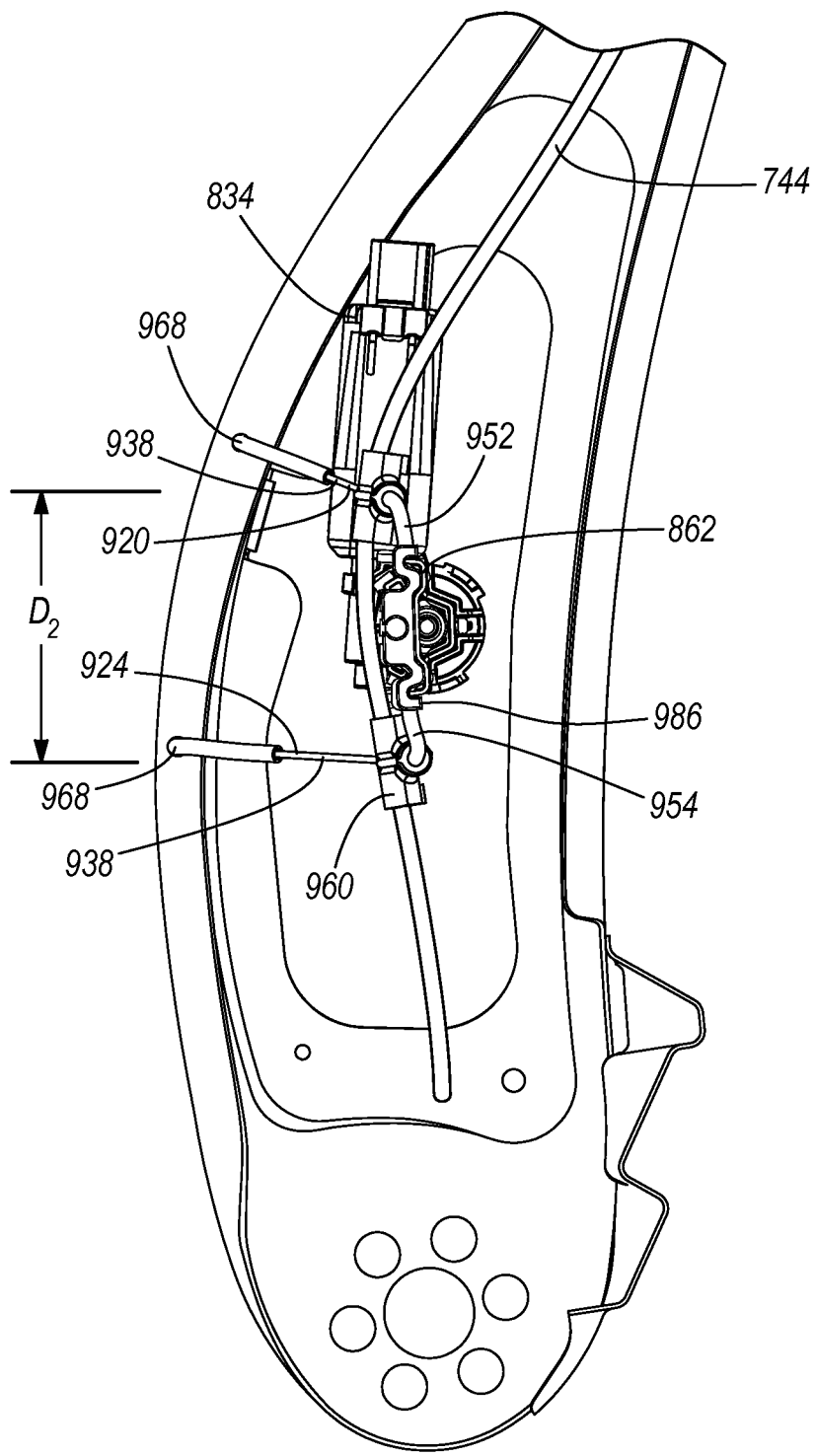
FIG. 19 is a partial side view of the lumbar support system of FIG. 14 in the first position.

Referring to FIG. 17, the lumbar mechanism 800 is shown in a medial position between the first position and the second position. To move the lumbar support mechanism 800 to the first position of FIGS. 18 and 19, the seat occupant activates the mechanism for clockwise rotation of the spindle 860 (viewed from the distal direction 824), which causes the proximal slider 880 to travel distally and the distal slider 884 to travel proximally along the spindle 860, i.e., the sliders 880, 884 approach each other. As the sliders 880, 884, with the respective connectors 944, converge, the second intermediate sections 951 of the cables 920, 924 are tensioned about the lateral outer wires 744 at the respective clips 960 in a manner similar to that described for FIG. 6 et seq., forcing the portion of the flexmat 740 spanned by the mechanism 800 in the upper lumbar region frontward, as shown in FIG. 19. Concurrently, the first intermediate sections 950 of the cables 920, 924 are relaxed, resulting in the seat occupant experiencing greater support in the upper lumbar region than in the lower lumbar region. When the proximal slider 880 contacts the bumper 912, the motor 834 stops, which ceases rotation of the spindle 860.

Figure 20:
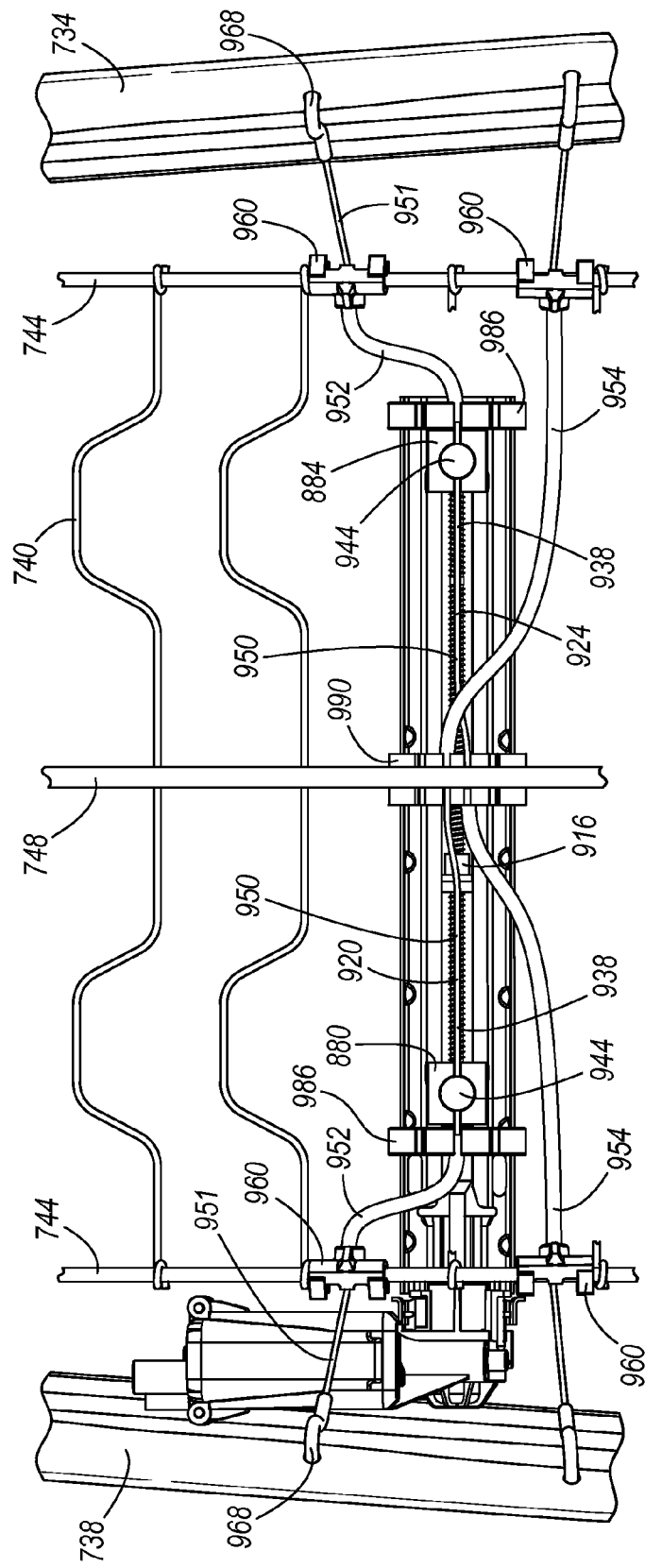
FIG. 20 is a partial front view of the lumbar support system of FIG. 14 in a second position.
Figure 21:
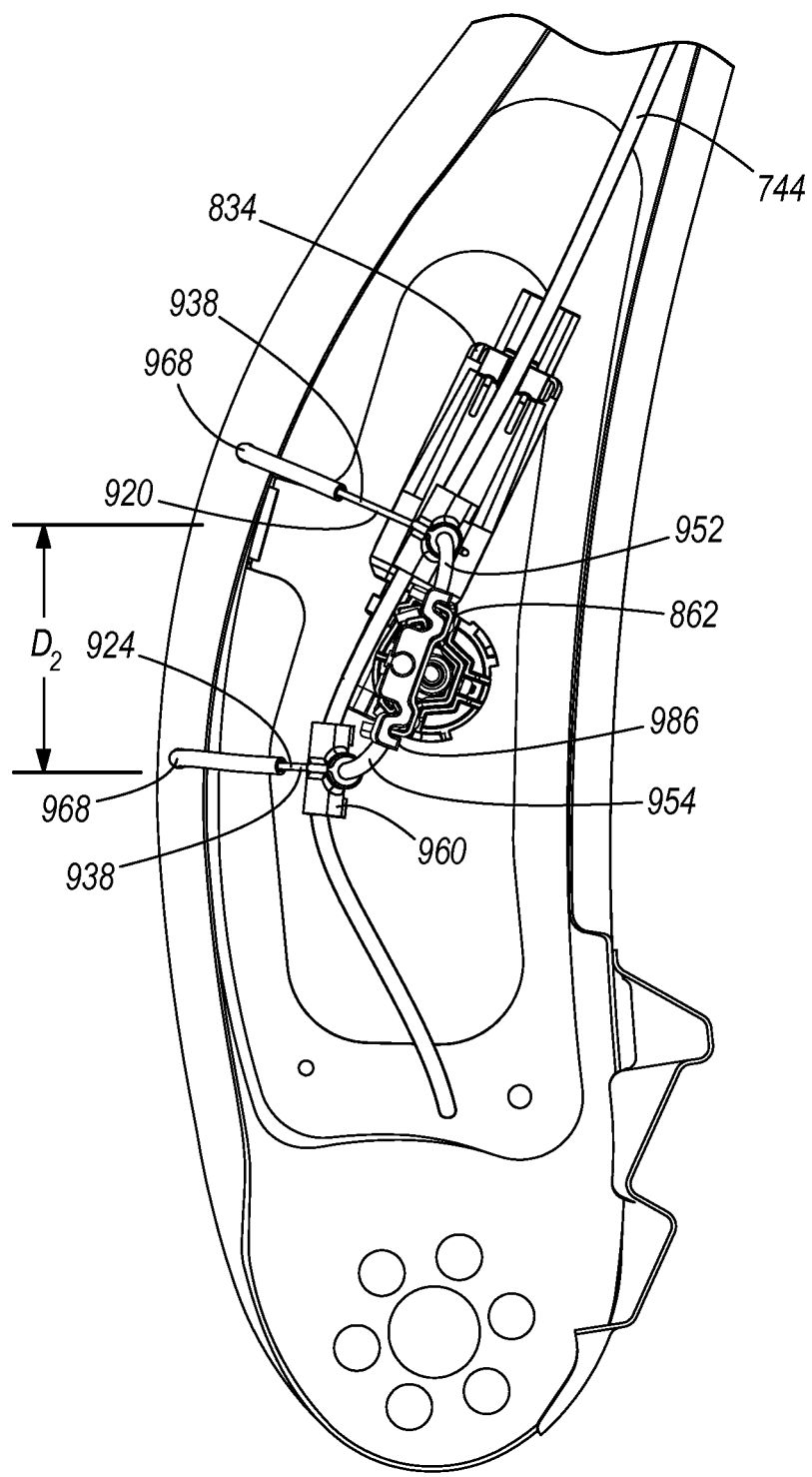
FIG. 21 is a partial side view of the lumbar support system of FIG. 14 in the second position.

To move the lumbar support mechanism 800 to the second position of FIGS. 20 and 21, the seat occupant activates the mechanism for counterclockwise rotation of the spindle 860 (viewed from the distal direction 824), which causes the proximal slider 880 to travel proximally and the distal slider 884 to travel distally along the spindle 860, i.e., the sliders 880, 884 separate. As the sliders 880, 884, with the respective connectors 944, diverge, the first intermediate sections 950 of the cables 920, 924 are tensioned about the lateral outer wires 744 at the respective clips 960 in a manner similar to that described for FIG. 6 et seq., forcing the portion of the flexmat 740 spanned by the mechanism 800 in the lower lumbar region frontward, as shown in FIG. 21. Concurrently, the second intermediate sections 951 of the cables 920, 924 are relaxed, resulting in the seat occupant experiencing greater support in the lower lumbar region than in the upper lumbar region. When the proximal slider 880 contacts the bumper 908, the motor 834 stops.

The vertical distance $D_2$ separating the upper lumbar region from the lower lumbar region, as illustrated in FIGS. 19 and 21, is approximately 70 mm, but can be of a greater or lesser magnitude for a particular application. In some constructions, the lumbar support mechanism 800 is configured to provide support only at the range limits illustrated in FIGS. 19 and 21. In other constructions, the mechanism 800 can operate and provide support at any position within the range illustrated in FIGS. 19 and 21.

The components of the lumbar support system of FIGS. 1, 6, 13, and 14 can be constructed from metal, plastic, or a combination of the two, e.g., the spindle 260, 560, 860 and spindle rail 192, 562, 862 can be a formed from a metal, such as aluminum, with the remaining components formed from a plastic.

Various features and advantages of the invention are set forth in the following claims.

What is claimed is:

1. A lumbar support system for a seat backrest, the system comprising:
   a fixed frame;
   a lumbar support coupled to the fixed frame, the lumbar support movable from a first position to a second position;
   a motor coupled to the lumbar support;
   a threaded member operatively engaged with the motor such that the motor rotates the threaded member about an axis;
   a first traveling member engaged with the threaded member;
   a second traveling member engaged with the threaded member, wherein rotation of the threaded member translates the first and second traveling members in opposite axial directions along the threaded member;
   a first flexible cable having a first end coupled to the first traveling member for movement therewith, a second end coupled to the fixed frame, and an intermediate portion operatively associated with the lumbar support; and a second flexible cable having a first end coupled to the second traveling member for movement therewith, a second end coupled to the fixed frame, and an intermediate portion operatively associated with the lumbar support, wherein the intermediate portion of the first flexible cable and the intermediate portion of the second flexible cable operate to move the lumbar support from the first position to the second position in response to translation of the first and second traveling members.

2. The lumbar support system of claim 1, wherein the lumbar support is a contour mat.

3. The lumbar support system of claim 1, wherein the fixed frame includes vertical members, and wherein the lumbar support is a basket positioned between the vertical support members.

4. The lumbar support system of claim 1, further including a spring disposed between the second end of one of the first or second flexible cables and the fixed frame.

5. The lumbar support system of claim 1, further including a hinge disposed between and coupled to the lumbar support and to the fixed frame.

6. The lumbar support system of claim 5, wherein the hinge pivots in response to movement of the lumbar support from the first position to the second position.

7. The lumbar support system of claim 5, further including a coupling disposed between the hinge and the fixed frame.

8. The lumbar support system of claim 1, wherein the first flexible cable and the second flexible cable are disposed in substantially the same plane during movement of the lumbar support from the first position to the second position.

9. The lumbar support system of claim 1, wherein a portion of one of the first flexible cable and the second flexible cable travels within a sleeve adjacent the lumbar support.

10. The lumbar support system of claim 1, wherein the first flexible cable forms an angle between the first and second ends that remains obtuse during movement of the lumbar support from the first position to the second position.

11. A lumbar support system for a seat backrest having a fixed frame, the system comprising:
   a lumbar support coupled to the fixed frame, the lumbar support movable from a first position to a second position;
   a motor for moving the lumbar support;
   a threaded member operatively associated with the motor such that the motor rotates the threaded member about an axis;
   a traveling member operatively associated with the threaded member, wherein rotation of the threaded member translates the traveling member along the threaded member; and
   a flexible cable having a first end and a second end, the first end coupled to the traveling member for movement therewith, and the second end coupled to the fixed frame such that translation of the traveling member in response to rotation of the threaded member moves the lumbar support from the first position to the second position.

12. An adjustable support system for a seat having a fixed frame, the adjustable support system comprising:
   a support movable from a first position to a second position relative to the frame;
   an actuator coupled to the support and configured to move the support between the first and second positions;
   a member operatively associated with and movable by the actuator, wherein the member has a length; and
   a flexible cable having a first end and a second end, the first end coupled to the member for travel along the length of the member and the second end coupled to the fixed frame such that movement of the member by the actuator causes the flexible cable to move the support between the first position and the second position.

13. The adjustable support system of claim 12, wherein movement of the member by the actuator causes the first end of the flexible cable to travel along the length of the member.

14. The adjustable support system of claim 13, wherein the actuator rotates the member and the first end of the flexible cable travels along the length of the member in response to rotation of the member.

15. The adjustable support system of claim 12, wherein upon actuation of the actuator contact between the support and a portion of the flexible cable intermediate the first and second ends moves the support from the first position to the second position.

16. The adjustable support system of claim 12, further comprising a traveling member operatively associated with the member for movement along the length of the member when the actuator moves the member, wherein the first end of the flexible cable is coupled to the traveling member.

17. The adjustable support system of claim 16, wherein the actuator rotates the member to move the traveling member along the length of the member.

18. The adjustable support system of claim 17, wherein upon movement of the traveling member along the length of the member, contact between the support and the flexible cable moves the support between the first and second positions.

19. The adjustable support system of claim 18, wherein a portion of the flexible cable intermediate the first and second ends contacts the support to move the support between the first and second positions.

* * * * *